(12) United States Patent
Kuwahara

(10) Patent No.: US 11,445,114 B2
(45) Date of Patent: Sep. 13, 2022

(54) IMAGING DEVICE, SOLID-STATE IMAGING ELEMENT, CAMERA MODULE, DRIVE CONTROL UNIT, AND IMAGING METHOD

(71) Applicant: SONY SEMICONDUCTOR SOLUTIONS CORPORATION, Kanagawa (JP)

(72) Inventor: Soichi Kuwahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 111 days.

(21) Appl. No.: 16/964,197

(22) PCT Filed: Jan. 22, 2019

(86) PCT No.: PCT/JP2019/001763
§ 371 (c)(1),
(2) Date: Jul. 22, 2020

(87) PCT Pub. No.: WO2019/151030
PCT Pub. Date: Aug. 8, 2019

(65) Prior Publication Data
US 2021/0037186 A1 Feb. 4, 2021

(30) Foreign Application Priority Data
Feb. 5, 2018 (JP) .............................. JP2018-018481

(51) Int. Cl.
*H04N 5/232* (2006.01)
*H04N 5/235* (2006.01)
(Continued)

(52) U.S. Cl.
CPC ....... *H04N 5/23287* (2013.01); *G02B 27/646* (2013.01); *H04N 5/235* (2013.01); *H04N 5/351* (2013.01)

(58) Field of Classification Search
CPC .... G02B 27/646; H04N 5/235; H04N 45/351; H04N 5/23287; H04N 5/2327; H04N 5/23267; H04N 5/23258; H01L 27/146
(Continued)

(56) References Cited

U.S. PATENT DOCUMENTS

| 2016/0057352 A1 | 2/2016 | Yoneda et al. |
| 2017/0187960 A1 | 6/2017 | Tsuchiya |

(Continued)

FOREIGN PATENT DOCUMENTS

| CN | 105191283 A | 12/2015 |
| CN | 107026960 A | 8/2017 |

(Continued)

OTHER PUBLICATIONS

International Search Report and Written Opinion of PCT Application No. PCT/JP2019/001763, dated Feb. 26, 2019, 11 pages of ISRWO.

*Primary Examiner* — Xi Wang
(74) *Attorney, Agent, or Firm* — Chip Law Group

(57) ABSTRACT

The present disclosure relates to an imaging device, a solid-state imaging element, a camera module, a drive control unit, and an imaging method for enabling reliable correction of an influence of a motion on an image. A state determination unit determines a state of a motion of an imaging unit that performs imaging to acquire an image via an optical system that collects light, and an exposure control unit performs at least control for an exposure time of the imaging unit according to a determination result by the state determination unit. Then, relative driving for the optical system or the imaging unit is performed to optically correct a blur appearing in the image according to an exposure period of one frame by the exposure time, and driving for resetting a relative positional relationship between the optical system and the imaging unit, the relative positional (Continued)

relationship being caused during the exposure period, is performed according to a non-exposure period in which exposure is not performed between the frames. The present technology can be applied to, for example, a stacked CMOS image sensor.

12 Claims, 29 Drawing Sheets

(51) Int. Cl.
*H04N 5/351* (2011.01)
*G02B 27/64* (2006.01)

(58) Field of Classification Search
USPC ............... 396/13, 52–55; 348/208.99, 219.1; 359/554–557
See application file for complete search history.

(56) References Cited

U.S. PATENT DOCUMENTS

| | | | |
|---|---|---|---|
| 2017/0272656 | A1 | 9/2017 | Kurata |
| 2018/0227513 | A1* | 8/2018 | Keung ............... H04N 5/37452 |
| 2018/0278821 | A1* | 9/2018 | Yu ...................... H04N 5/23258 |
| 2019/0191088 | A1* | 6/2019 | Murashima ........ H04N 5/23267 |

FOREIGN PATENT DOCUMENTS

| | | |
|---|---|---|
| EP | 2981062 A1 | 2/2016 |
| EP | 3220624 A1 | 9/2017 |
| JP | 2010-078635 A | 4/2010 |
| JP | 2016-024235 A | 2/2016 |
| JP | 2017-116840 A | 6/2017 |
| JP | 2017-169074 A | 9/2017 |
| KR | 10-2015-0135771 A | 12/2015 |
| TW | 201448594 A | 12/2014 |
| WO | 2014/156731 A1 | 10/2014 |

\* cited by examiner

IMAGING DEVICE, SOLID-STATE IMAGING ELEMENT, CAMERA MODULE, DRIVE CONTROL UNIT, AND IMAGING METHOD

CROSS REFERENCE TO RELATED APPLICATIONS

This application is a U.S. National Phase of International Patent Application No. PCT/JP2019/001763 filed on Jan. 22, 2019, which claims priority benefit of Japanese Patent Application No. JP 2018-018481 filed in the Japan Patent Office on Feb. 5, 2018. Each of the above-referenced applications is hereby incorporated herein by reference in its entirety.

TECHNICAL FIELD

The present disclosure relates to an imaging device, a solid-state imaging element, a camera module, a drive control unit, and an imaging method, and particularly to an imaging device, a solid-state imaging element, a camera module, a drive control unit, and an imaging method for enabling reliable correction of an influence of a motion of an imaging unit on an image.

BACKGROUND ART

Conventionally, as a technology for correcting camera shake in an imaging device, optical image stabilizer (OIS) or electronic image stabilization (EIS) has been used. In the optical image stabilizer, it is possible to correct a blur by relatively moving a lens or an imaging element in parallel according to the amount of blur and shifting a position of an image on the imaging element. In the electronic image stabilization, it is possible to correct a blur by cutting out an image captured by an imaging element and adopting the cutout image as an output image, and shifting a cutout position according to the amount of blur.

By the way, a main cause of actual camera shake is a rotational motion, and the influence of a parallel motion is small, and in particular, the influence of a parallel motion becomes smaller as a distance to an object becomes more distant. In the optical image stabilizer technology, there are some cases where a periphery is deformed because the rotational motion is corrected according to the parallel motion of a lens or an imaging element. Similarly, the electronic image stabilization has the problem that a periphery is deformed because the correction is conducted by moving the cutout position in parallel.

Furthermore, measures against deformation (focal plane phenomenon) has not been taken, the deformation being caused by a difference in a moving amount in one screen due to deviation of an exposure time for each line of a pixel, the deviation occurring in an imaging element using a rolling shutter such as a complementary metal oxide semiconductor (CMOS) image sensor.

Therefore, as disclosed in Patent Document 1, an imaging device capable of performing image stabilization corresponding to a difference in a moving amount depending on a position in an image plane or a difference in a moving amount due to deviation of an exposure time in one screen has been proposed. By adopting the image stabilization, the camera shake can be corrected from the center to the periphery with extremely high accuracy, and the deformation due to the focal plane phenomenon can also be corrected.

CITATION LIST

Patent Document

Patent Document 1: International Publication No. 2014/156731

SUMMARY OF THE INVENTION

Problems to be Solved by the Invention

By the way, in a case where imaging is performed outdoors during the daytime or the like with a short exposure time, the above-described image stabilization in Patent Document 1 can almost completely correct the influence of camera shake and suppress occurrence of a blur and deformation in an image. However, in a case where imaging is performed in a dark place, during the night time, or the like with a long exposure time, the above-described image stabilization in Patent Document 1 can correct occurrence of positional deviation and deformation in an image but has a difficulty in suppressing occurrence of a blur (hereinafter referred to as a blur during an exposure time or an exposure blur) of a point image during exposure.

The present disclosure has been made in view of such a situation, and to suppress occurrence of a blur during an exposure time and enable reliable correction of an influence of a motion of an imaging unit on an image.

Solutions to Problems

An imaging device according to one aspect of the present disclosure includes a state determination unit configured to determine a state of a motion of an imaging unit that performs imaging to acquire an image via an optical system that collects light, and an exposure control unit configured to perform at least control for an exposure time of the imaging unit according to a determination result by the state determination unit, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

A solid-state imaging element according to one aspect of the present disclosure is configured by stacking a semiconductor chip on which an imaging unit that performs imaging to acquire an image via an optical system that collects light is formed, and a semiconductor chip on which a logic unit including a state determination unit that determines a state of a motion of the imaging unit and an exposure control unit that performs at least control for an exposure time of the imaging unit according to a determination result by the state determination unit is formed, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

A camera module according to one aspect of the present disclosure includes an optical system configured to collect light, an imaging unit configured to perform imaging via the optical system to acquire an image, a state determination unit configured to determine a state of a motion of the imaging unit, and an exposure control unit configured to perform at least control for an exposure time of the imaging unit according to a determination result by the state determination unit, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

A drive control unit according to the one aspect of the present disclosure in which at least control for an exposure time of an imaging unit that performs imaging to acquire an image via an optical system that collects light is performed according to a determination result of a state of a motion of the imaging unit, the drive control unit configured to control relative driving for the optical system or the imaging unit to optically correct a blur appearing in the image according to an exposure period of one frame by the exposure time; and control driving for resetting a relative positional relationship between the optical system and the imaging unit, the relative positional relationship being caused during the exposure period, according to a non-exposure period in which exposure is not performed between the frames.

An imaging method according to one aspect of the present disclosure includes, by an imaging device including an imaging unit that performs imaging to acquire an image via an optical system that collects light, determining a state of a motion of the imaging unit, and performing at least control for an exposure time of the imaging unit according to a determination result by the state determination unit, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

According to one aspect of the present disclosure, a state of a motion of an imaging unit that performs imaging to acquire an image via an optical system that collects light is determined, at least control for an exposure time of the imaging unit is performed according to the determination result, relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

Effects of the Invention

According to one aspect of the present disclosure, the influence of a motion of an imaging unit on an image can be reliably corrected.

MODE FOR CARRYING OUT THE INVENTION

First, vibration and image stabilization processing of an imaging device will be described with reference to FIGS. 1A, 1B, 1C, 2, 3, 4, 5, 6, 7, 8, 9, 10, 11, and 12 before describing the imaging device to which the present technology is applied.

<Vibration and Image Stabilization Processing of Imaging Device>

Figure 1A:
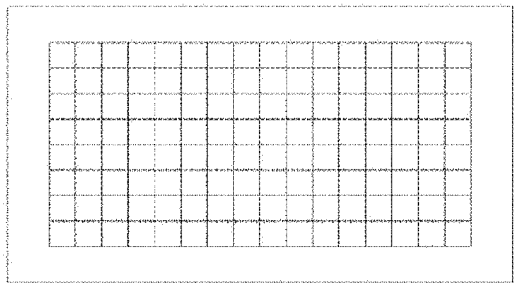
FIGS. 1A, 1B, and 1C are diagrams illustrating examples of distortion generated in an image due to an influence of lens distortion.
Figure 1B:
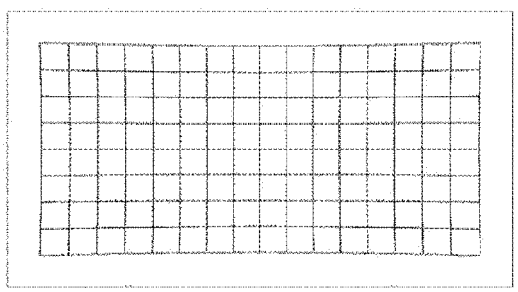
Figure 1C:
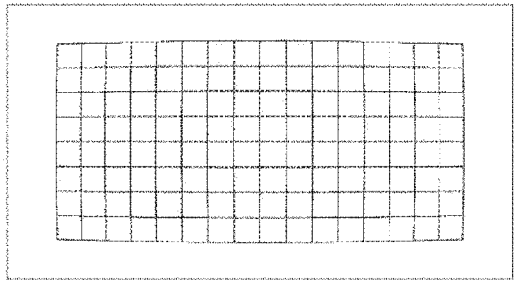

FIGS. 1A, 1B, and 1C illustrate examples of distortion generated in images due to an influence of lens distortion when an object is captured by an imaging device.

For example, when a lattice pattern as illustrated in FIG. 1A is captured as an object, pincushion distortion where a peripheral portion shrinks inward occurs as illustrated in FIG. 1B or barrel distortion where the peripheral portion extends outward occurs as illustrated in FIG. 1C.

Figure 2:
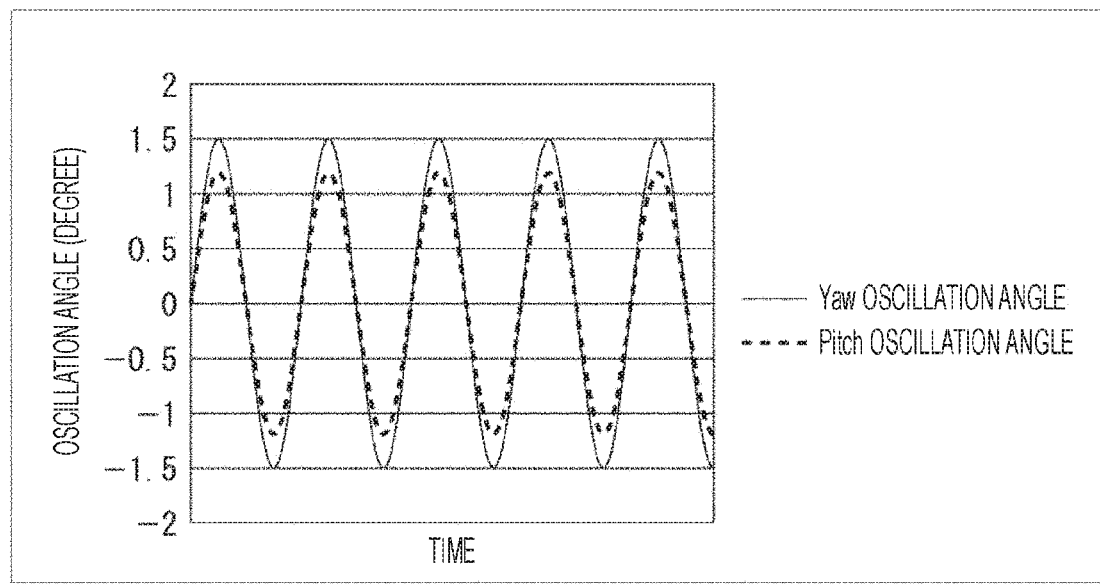
FIG. 2 is a diagram illustrating vibration conditions applied to an imaging device.

Hereinafter, description will be given regarding a blur that is generated in an image when imaging is performed while providing vibration under vibration conditions (an oscillation angle in a yaw direction: 1.5 degrees and an oscillation angle in a pitch direction: 1.2 degrees) illustrated in FIG. 2 in an imaging device having a pincushion lens distortion as illustrated in FIG. 1B. The left side in FIGS. 3 to 12 illustrates four images captured at around points where the oscillation angle becomes minimum (for example, two points where the oscillation angle becomes 0 degrees) and around points where the oscillation angle becomes maximum (for example, two points where the yaw oscillation angle becomes 1.5 degrees and −1.5 degrees) in one cycle of vibration illustrated in FIG. 2. Furthermore, the right side in FIGS. 3 to 12 illustrates an image in which the four images are superimposed.

Figure 3:
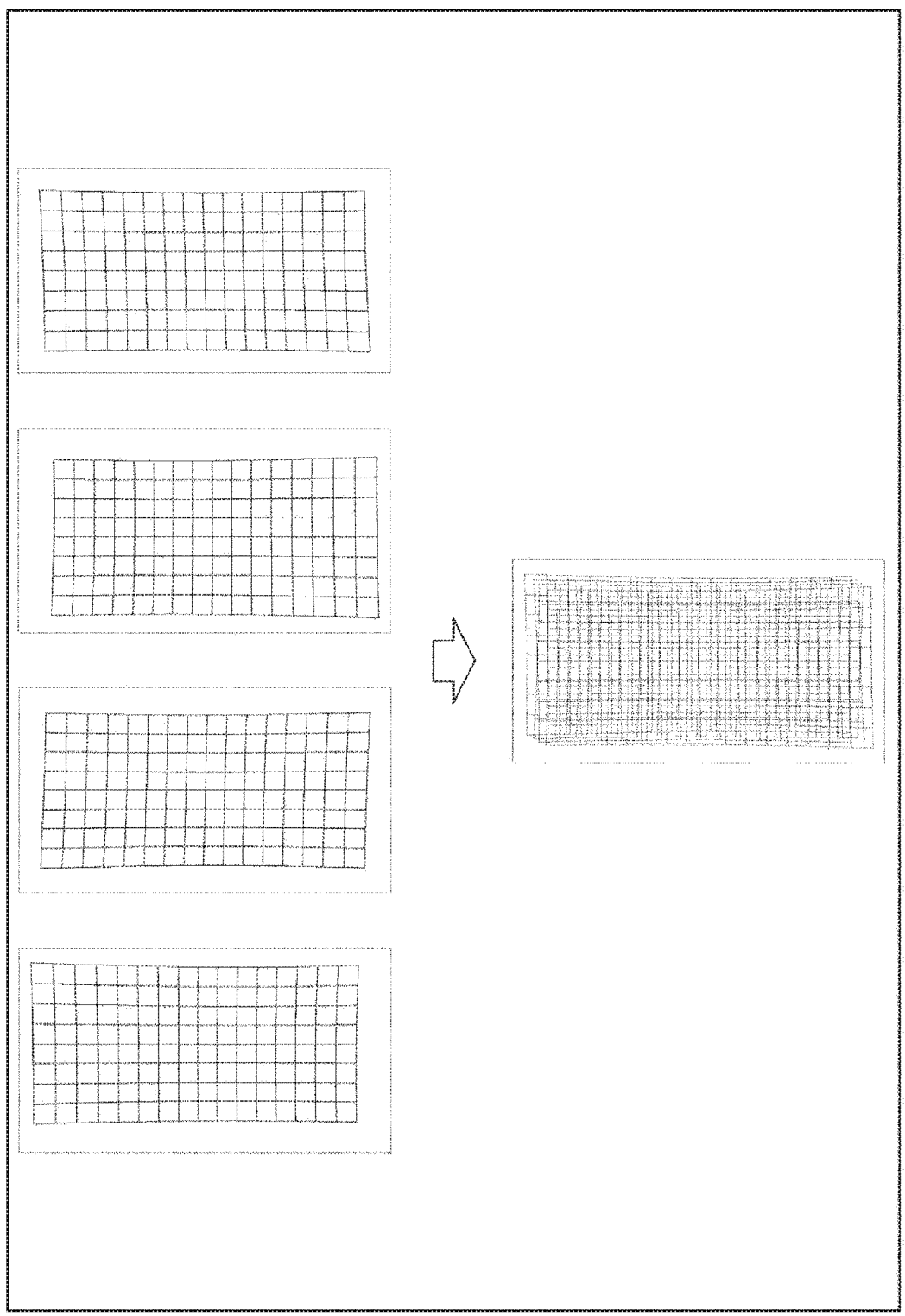
FIG. 3 is a diagram illustrating examples of images output without correcting a blur.

FIG. 3 illustrates examples of images to be output without applying correction processing for correcting a blur to the vibration.

As illustrated in FIG. 3, various deformations according to positions in an image plane are generated due to influences of positional deviation, peripheral deformation, and a rolling shutter caused by the vibration of the imaging device.

Figure 4:
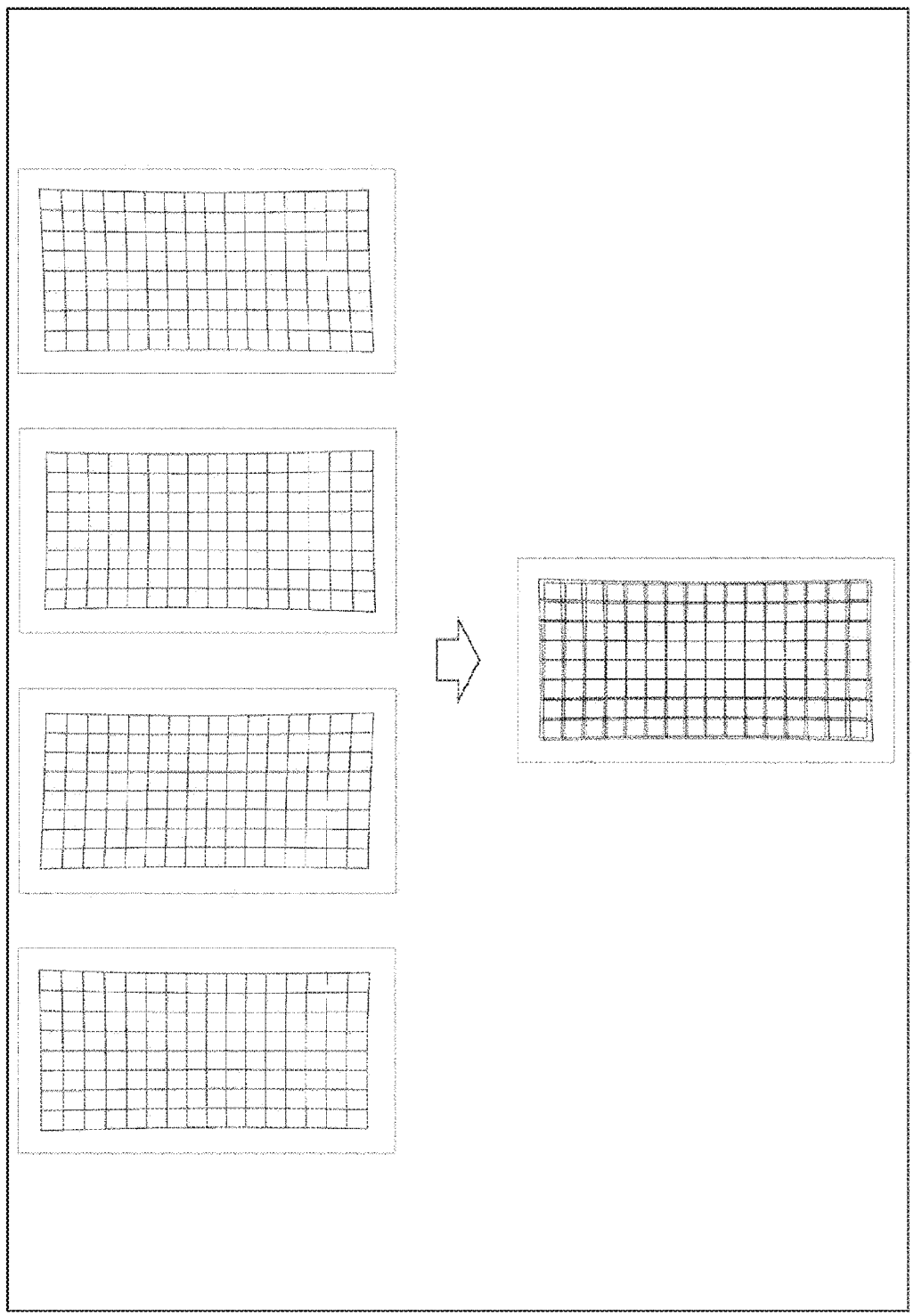
FIG. 4 is a diagram illustrating examples of images to which correction processing by ordinary electronic image stabilization has been applied.

FIG. 4 illustrates examples of images to which correction processing by ordinary electronic image stabilization has been applied. Here, the ordinary electronic image stabilization is to correct a blur by cutting out an image captured by an imaging element and adopting the cutout image as an output image, and shifting a cutout position according to a blur amount, which is different from the above-described correction processing in Patent Document 1 and correction processing in Patent Document 2 to be described below.

As illustrated on the left side in FIG. 4, by applying the correction processing by the normal electronic image stabilization, images with a shifted cutout position according to a blur amount are output. Therefore, when these images are superimposed, the images are corrected such that center positions on the screen of the images between frames coincide with one another, as illustrated on the right side in FIG. 4. However, the correction processing by the ordinary electronic image stabilization cannot correct the peripheral deformation due to the rolling shutter or camera shake.

Figure 5:
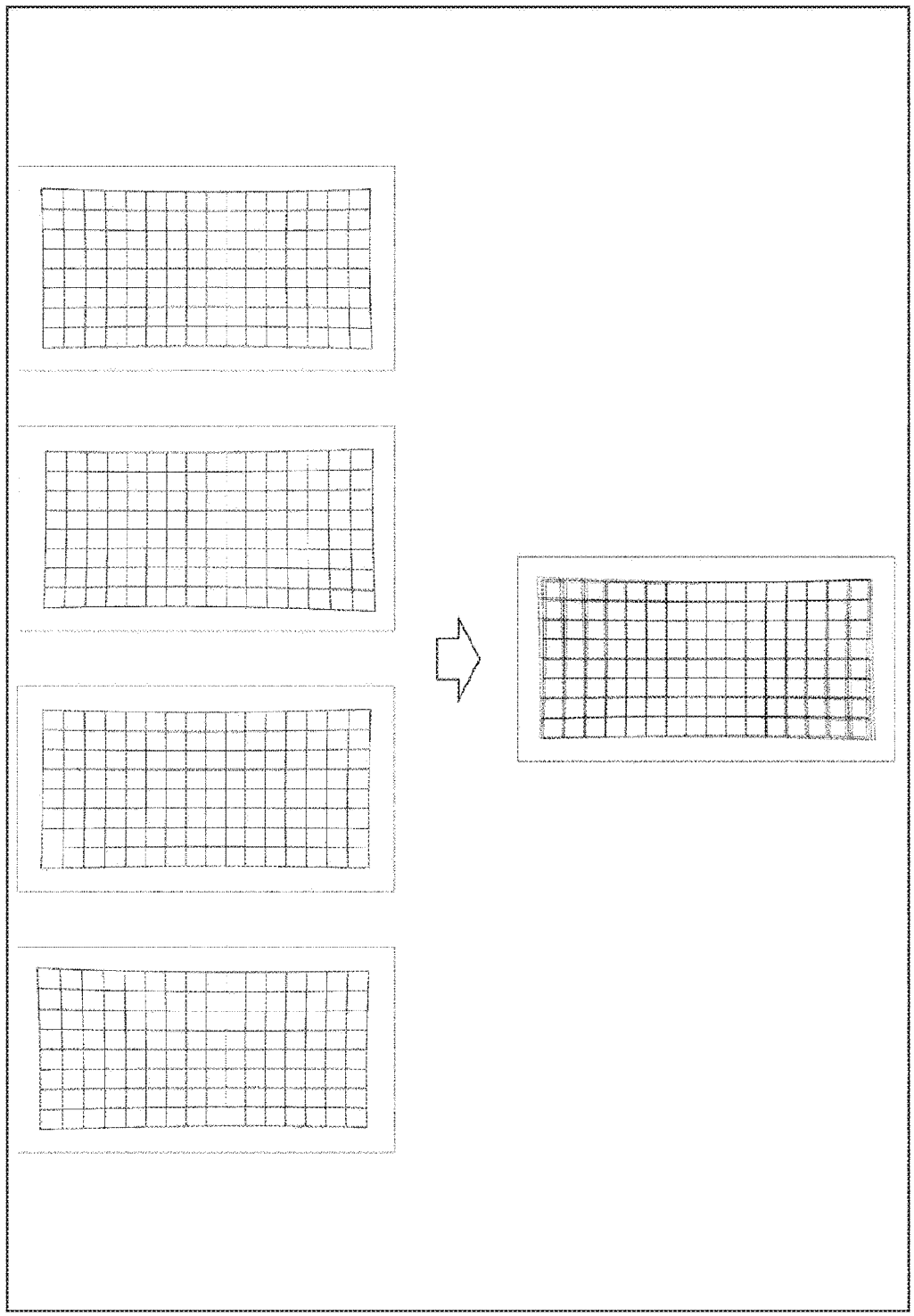
FIG. 5 is a diagram illustrating examples of images to which correction processing by optical image stabilizer has been applied.

FIG. 5 illustrates examples of images to which correction processing by optical image stabilizer has been applied.

As illustrated on the left side in FIG. 5, by applying the correction processing by the optical image stabilizer, images captured while relatively moving the lens or the imaging element in parallel according to the blur amount are output. Therefore, when these images are superimposed, center positions on the screen of the images between frames can be corrected and the influence of the rolling shutter can also be corrected, as illustrated on the right side in FIG. 5. However, in this case, the peripheral deformation due to camera shake cannot be corrected.

Note that, in the optical image stabilizer (a barrel shift method or a sensor shift method), occurrence of a blur during an exposure time can be suppressed by applying the correction processing to follow the vibration during exposure although the influence of the peripheral deformation and the lens distortion remains.

Figure 6:
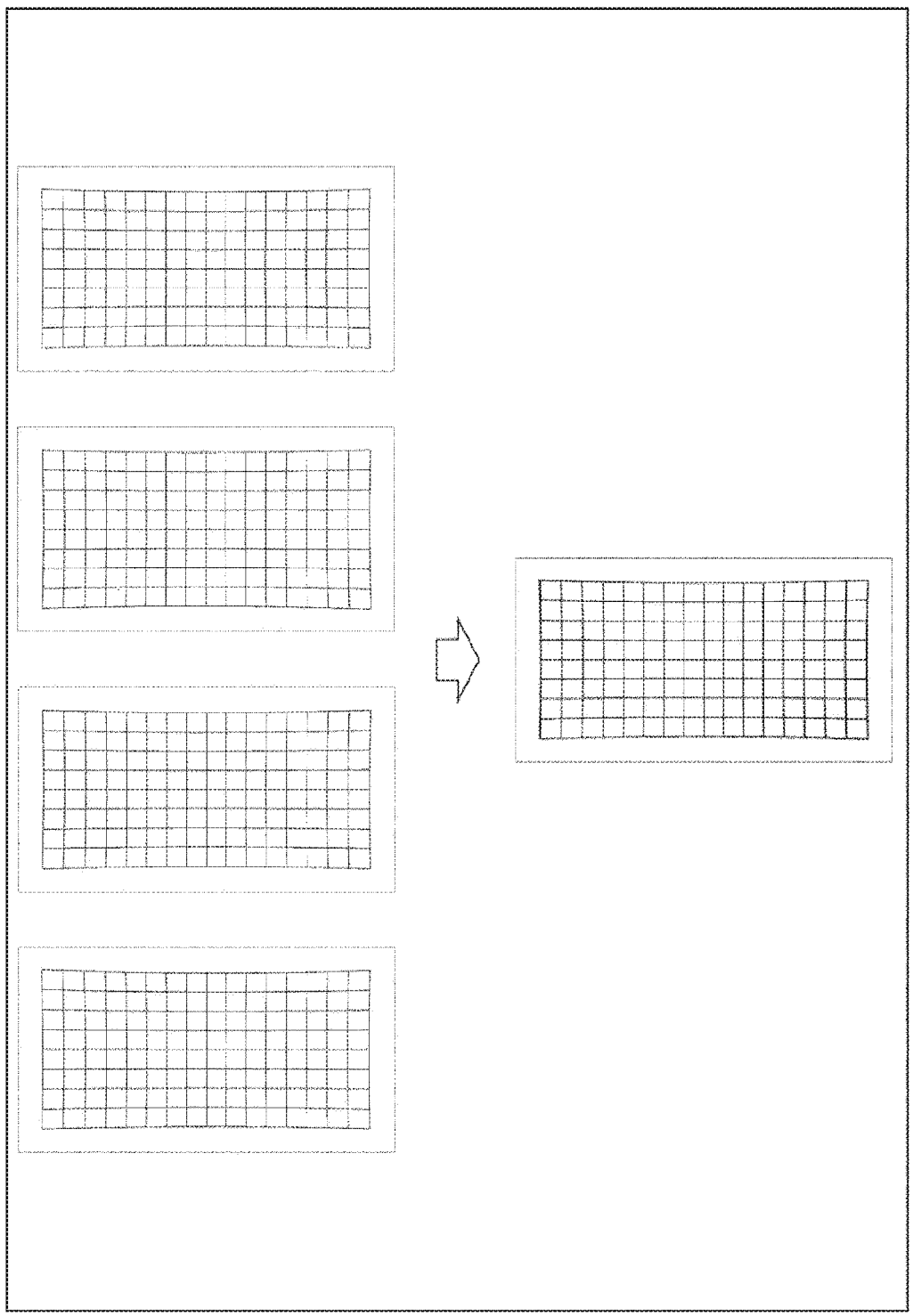
FIG. 6 is a diagram illustrating examples of images to which correction processing by image stabilization proposed in Patent Document 1 has been applied.

FIG. 6 illustrates examples of images to which correction processing by image stabilization proposed in above-described Patent Document 1 has been applied. In the image stabilization in Patent Document 1, not only the cutout position is shifted like the ordinary electronic image stabilization but also deformation is performed for each pixel position corresponding to the difference in a moving amount depending on a position in an image plane or the difference in a moving amount due to exposure time deviation in one screen.

As illustrated in FIG. 6, by applying the correction processing by the image stabilization proposed in Patent Document 1, the blur is reliably corrected from the center to the periphery of the images. Note that, since the influence of lens distortion is not taken into consideration in this correction processing, there is an error due to the influence of lens distortion in an actual capture result, and some positional deviation occurs in a peripheral portion. Note that this positional deviation varies depending on the shape of the lens distortion.

Therefore, as previously filed in PCT/JP2016/070261 (hereinafter referred to Patent Document 2), correction processing capable of image stabilization in consideration of the influence of lens distortion has been proposed.

Images to which correction processing by the image stabilization proposed in Patent Document 2 will be described with reference to FIGS. 7 and 8.

Figure 7:
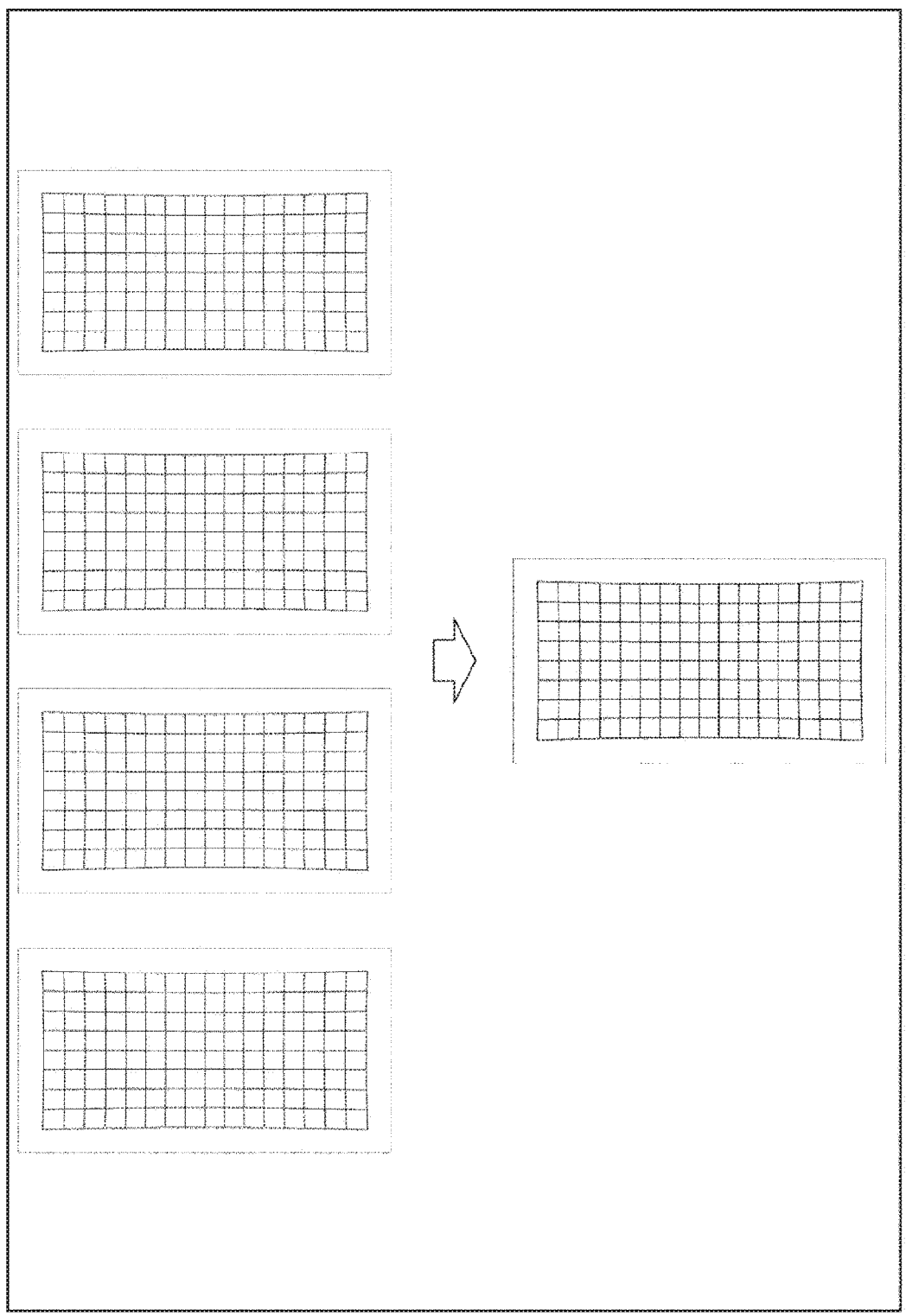
FIG. 7 is a diagram illustrating examples of images to which correction processing by image stabilization proposed in Patent Document 2 has been applied but correction for lens distortion itself is not performed.

FIG. 7 illustrates examples of images to which the correction processing by the image stabilization in Patent Document 2 has been applied, and to which correction for the lens distortion itself is not performed while correction for deformation due to camera shake generated by the influence of the lens distortion is performed.

As illustrated in FIG. 7, by applying the correction processing by the image stabilization proposed in Patent Document 2, the blur is reliably corrected from the center to the periphery of the images.

Figure 8:
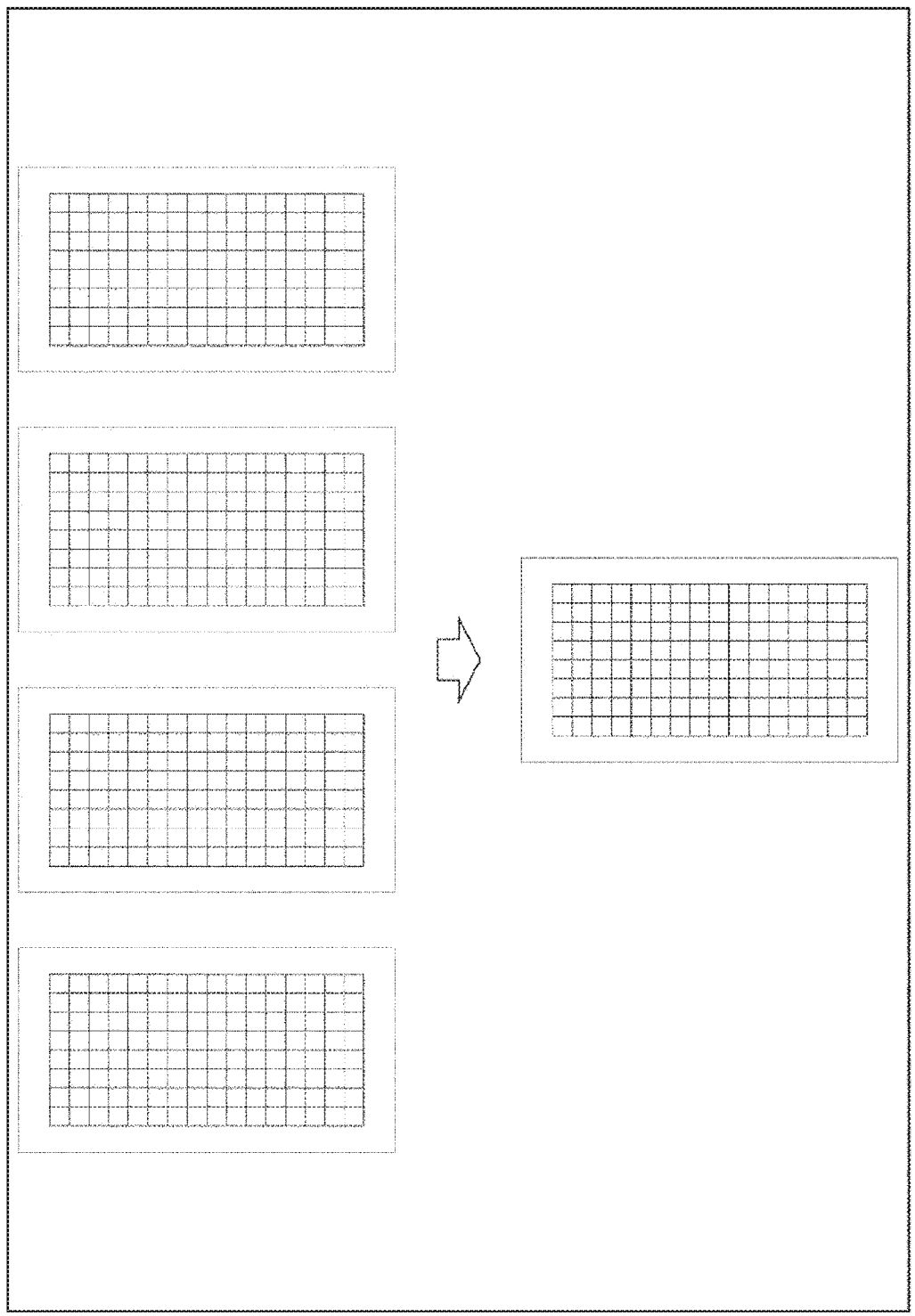
FIG. 8 is a diagram illustrating examples of images to which correction processing by image stabilization proposed in Patent Document 2 has been applied and correction for lens distortion itself is performed.

FIG. 8 illustrates examples of images to which the correction processing by the image stabilization in Patent Document 2 has been applied, and to which correction for deformation due to camera shake generated by the influence of the lens distortion is performed and correction for the lens distortion itself is performed.

As illustrated in FIG. 8, by applying the correction processing by the image stabilization proposed in Patent Document 2, the blur is reliably corrected from the center to the periphery of the images after the lens distortion is corrected.

By the way, in a case where imaging is performed outdoors during the daytime or the like with a short exposure time, the image stabilization can be almost completely performed by the correction processing by the image stabilization proposed in Patent Document 2. In contrast, in a case where imaging is performed in a dark place, during the night time, or the like with a long exposure time, a blur during the exposure time occurs.

Figure 9:
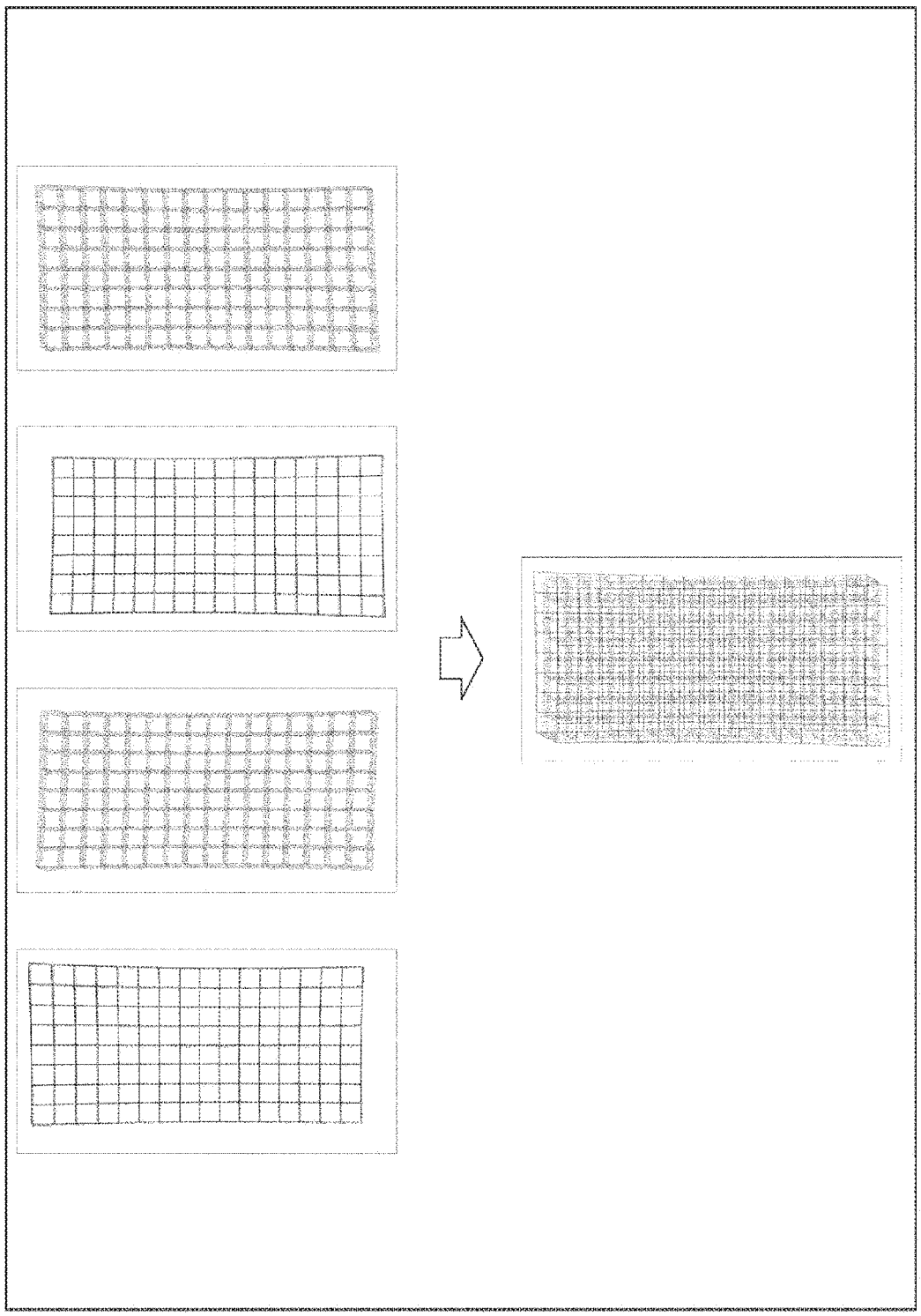
FIG. 9 is a diagram illustrating examples of images to be output without correcting a blur in a case where imaging is performed with a long exposure time.

FIG. 9 illustrates images to be output without correcting a blur due to the vibration, similarly to FIG. 3, in the case where imaging is performed with a long exposure time.

As illustrated in FIG. 9, various deformations according to positions in an image plane are generated due to the influences of positional deviation, peripheral deformation, and the rolling shutter caused by the imaging with a long exposure time. In addition, a blur during the exposure time occurs.

Figure 10:
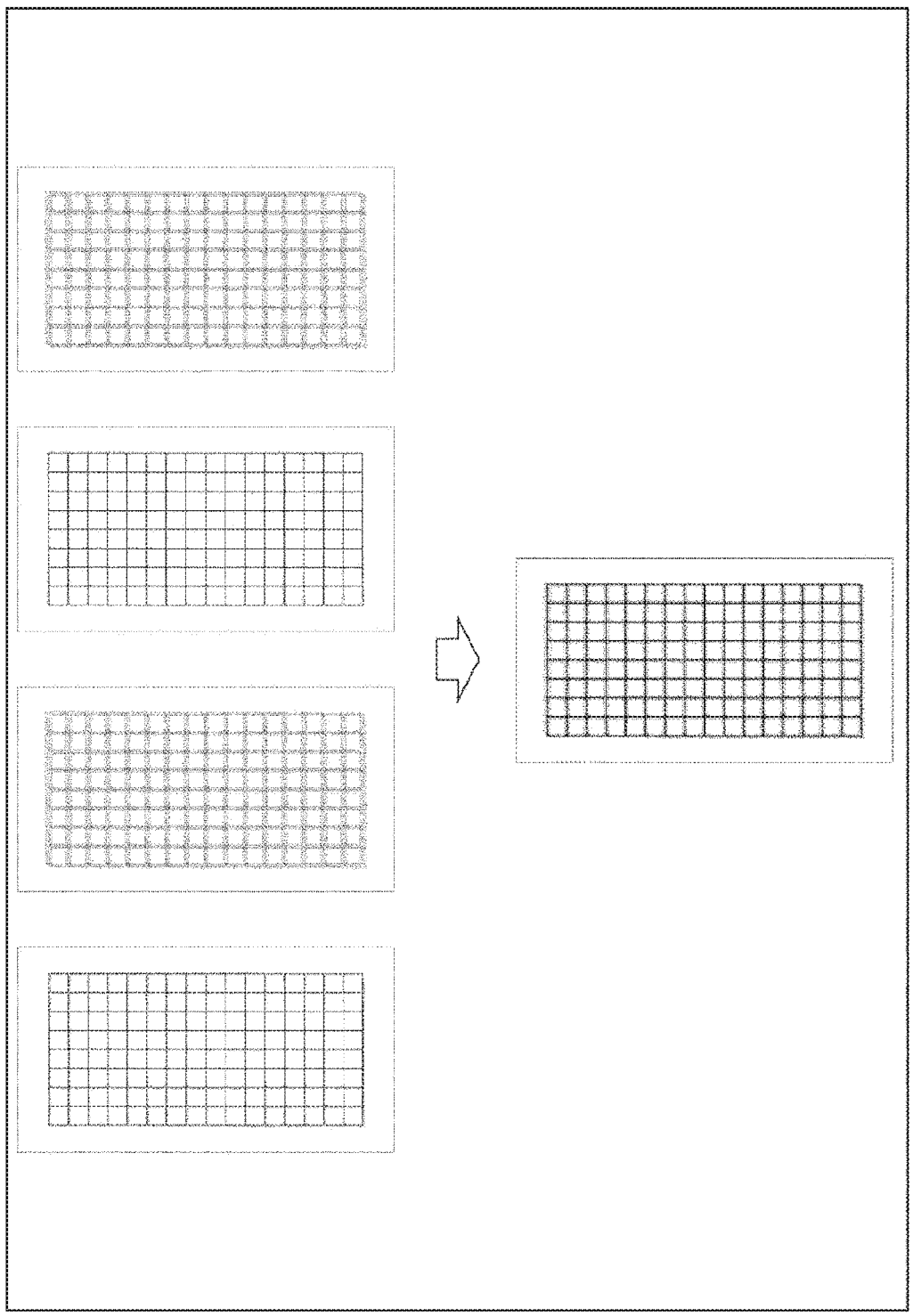
FIG. 10 is a diagram illustrating examples of images to which correction processing by image stabilization proposed in Patent Document 2 has been applied and correction for lens distortion is performed in a case where imaging is performed with a long exposure time.

FIG. 10 illustrates images to which the correction processing by the image stabilization in Patent Document 2 has been applied, and to which correction for deformation due to camera shake generated by the influence of the lens distortion is performed and correction for the lens distortion itself is performed, in the case where imaging is performed with a long exposure time.

Even by the correction processing by the image stabilization proposed in Patent Document 2, the positions coincide in the corrected images, but the images become images in which the camera shake has not been reliably corrected due to occurrence of the blur during the exposure time. That is, the images have the blur during the exposure time while the positional deviation, deformation, or the like due to the camera shake has been corrected from the center to the periphery after the lens distortion is corrected.

Figure 11:
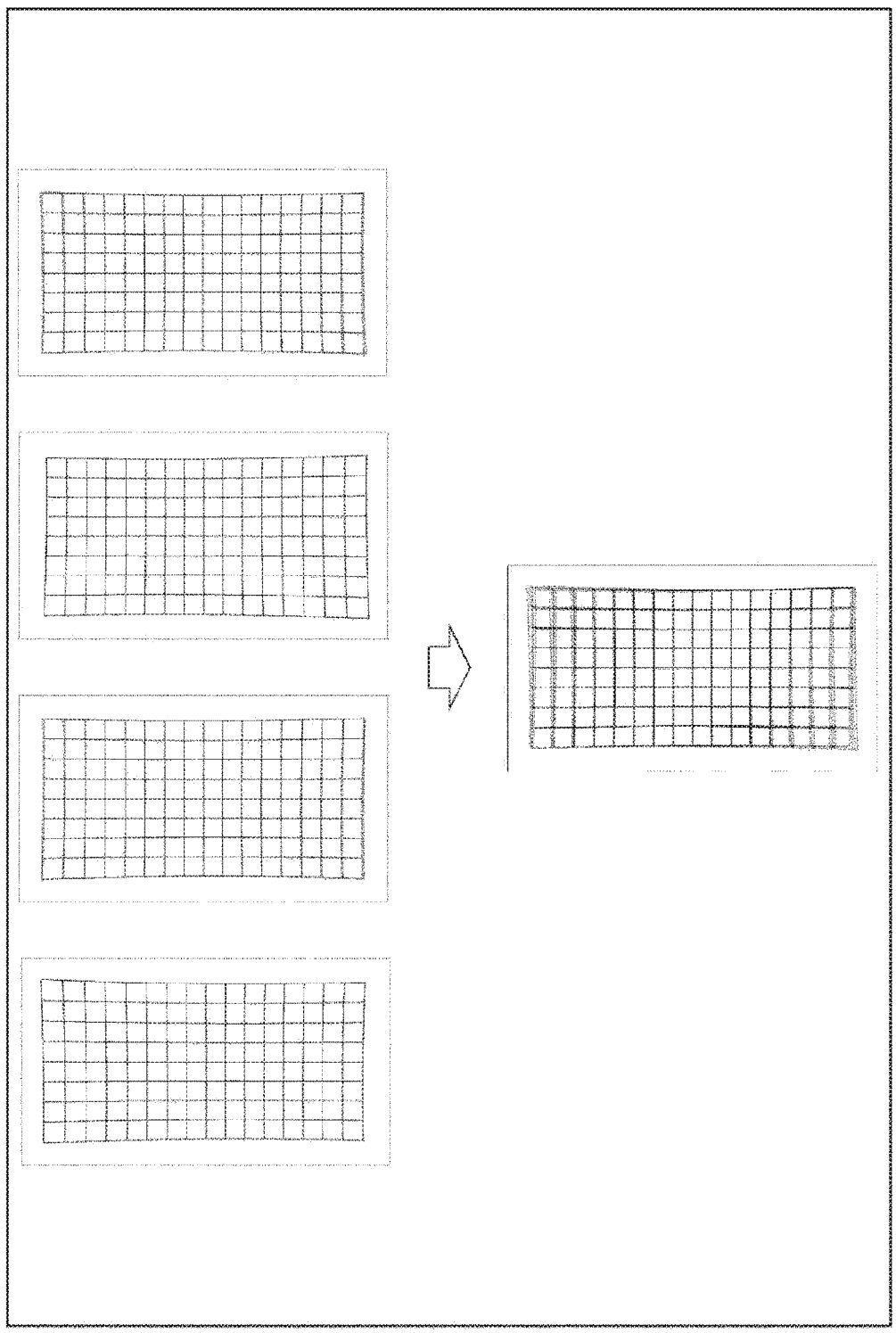
FIG. 11 is a diagram illustrating examples of images to which correction processing by optical image stabilizer has been applied in a case where imaging is performed with a long exposure time.

Furthermore, FIG. 11 illustrates images to which the correction processing by the optical image stabilizer (barrel shift method or sensor shift method) has been applied in the case where imaging is performed with a long exposure time.

As illustrated in FIG. 11, in the correction processing by the optical image stabilizer, the peripheral deformation due to camera shake cannot be corrected. However, occurrence of the blur during the exposure time can be suppressed by relative movement of the lens and the imaging element during the exposure time.

Therefore, the applicant of the present application proposes correction processing for suppressing the influence provided by camera shake on an image and reliably correcting a blur in the image even in a case where the exposure time is long, as in an imaging device 11 in FIG. 13 or an imaging device 11A in FIG. 17 to be described below. By the correction processing, the blur can be corrected from the center to the periphery after the lens distortion is corrected, and occurrence of the blur during the exposure time can be suppressed.

Figure 12:
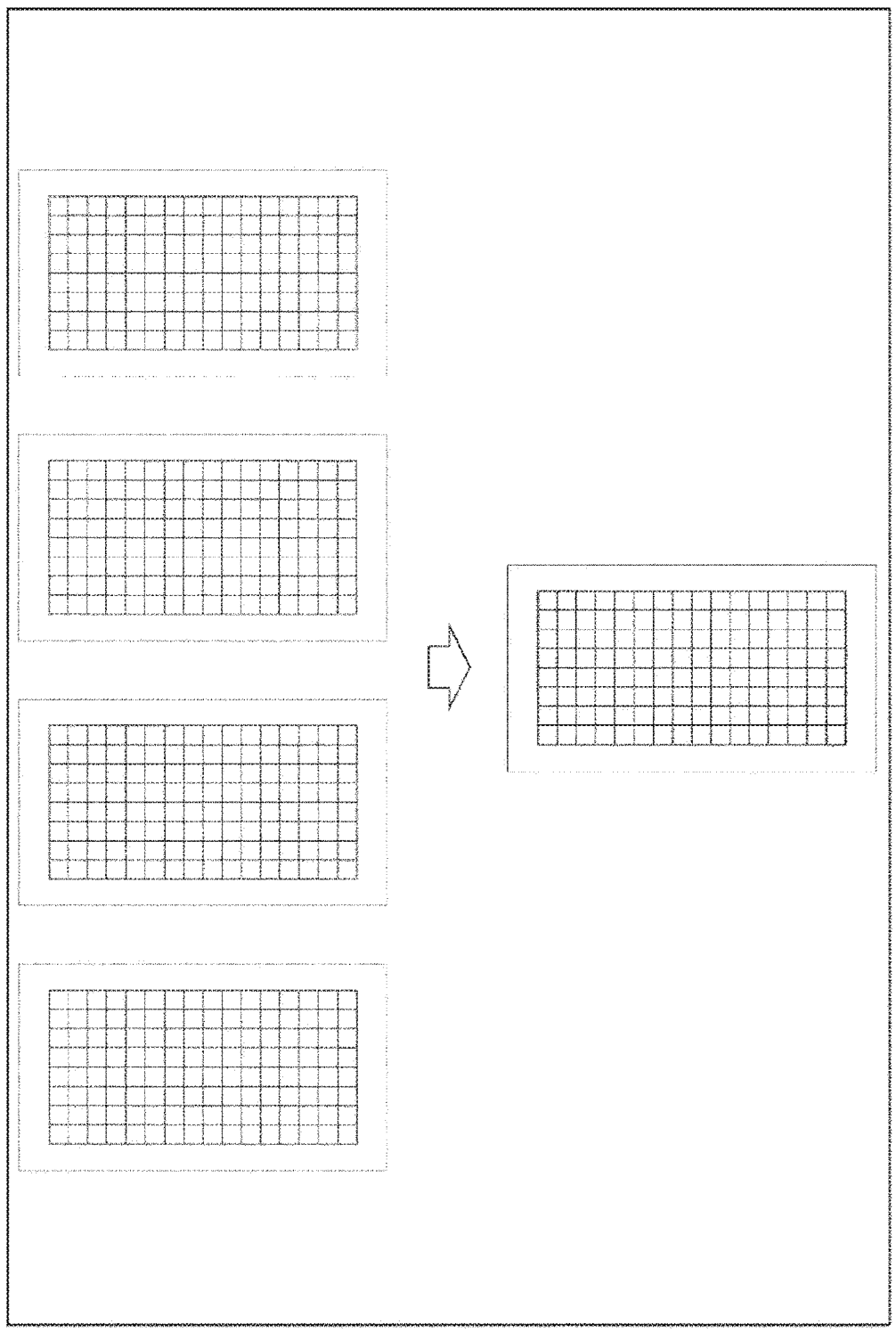
FIG. 12 is a diagram illustrating examples of images to which correction processing by image stabilization used in the present technology has been applied.

That is, as illustrated in FIG. 12, by applying the correction processing to which the present technology is applied, the blur can be reliably corrected from the center to the periphery, and occurrence of the blur during the exposure time can be suppressed, after the lens distortion is corrected.

Note that, since an exposure blur due to peripheral deformation during the exposure time cannot be suppressed by the optical image stabilizer, it is assumed that some blur during the exposure time remains in the periphery of the image depending on the vibration conditions and the exposure time. However, the blur during the exposure time can be suppressed to the extent that the blur is hardly noticeable in normal capture.

Furthermore, FIG. 12 illustrates images for which correction for the lens distortion itself has been performed, similarly to FIG. 8. Note that, although not illustrated, even in a case where correction for the lens distortion itself is not performed, the blur can be reliably corrected from the center to the periphery and occurrence of the blur during the exposure time can be suppressed, similarly to FIG. 7.

<Image Stabilization Used in Present Technology>

Hereinafter, specific embodiments to which the present technology is applied will be described in detail with reference to the drawings. First, the image stabilization used in the present technology will be described with reference to FIGS. 13 to 16.

Figure 13:
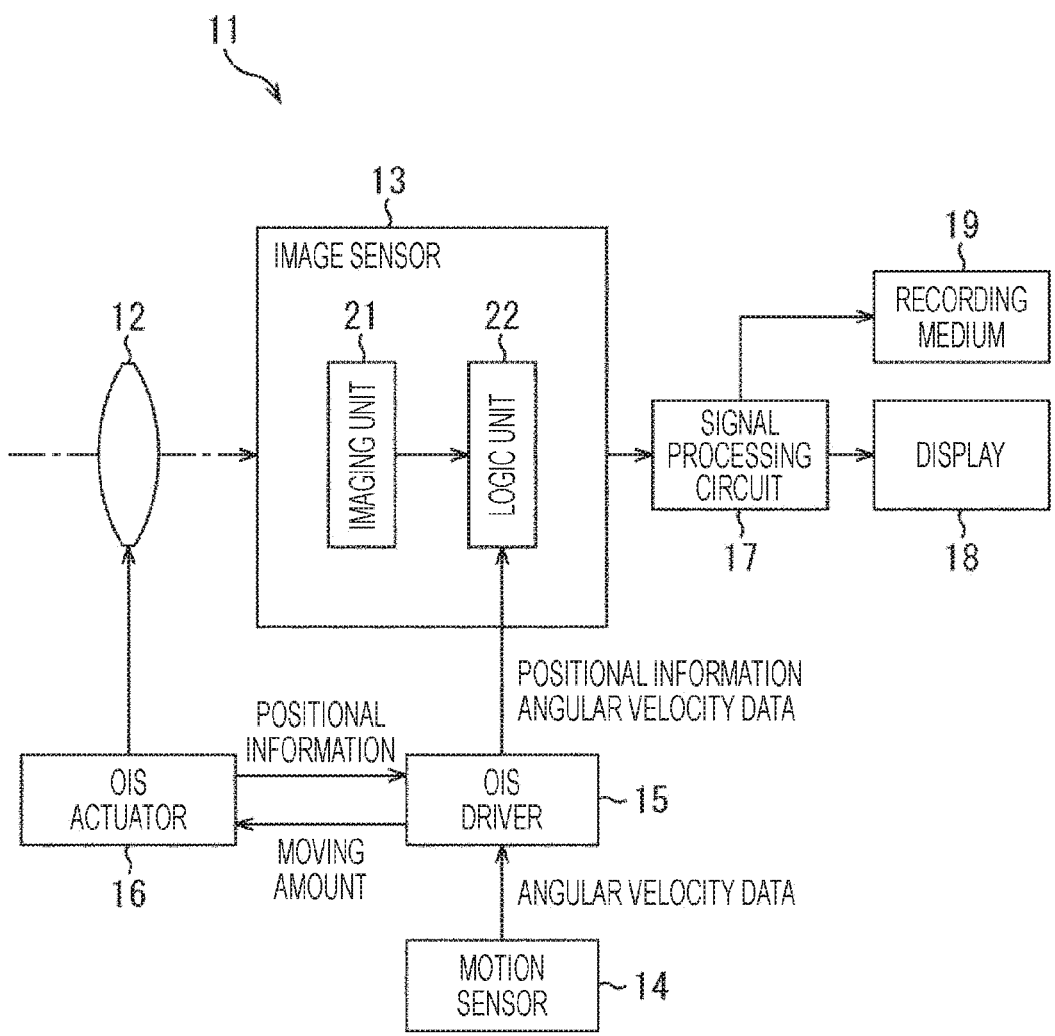
FIG. 13 is a block diagram illustrating a configuration example of an imaging device for describing image stabilization used in the present technology.

FIG. 13 is a block diagram illustrating a configuration example of an imaging device for describing image stabilization used in the present technology.

As illustrated in FIG. 13, the imaging device 11 includes a lens unit 12, an image sensor 13, a motion sensor 14, an OIS driver 15, an OIS actuator 16, a signal processing circuit 17, a display 18, and a recording medium 19.

The lens unit 12 includes one or a plurality of lenses, collects light from an object, and forms an image of the object on a sensor surface of an imaging unit 21 included in the image sensor 13.

The image sensor 13 is configured by stacking a semiconductor chip on which the imaging unit 21 is formed and a semiconductor chip on which a logic unit 22 is formed, and an interface for taking an output from the OIS driver 15 is mounted.

The imaging unit 21 has light collected from the object by the lens unit 12, captures an image of the object formed on the sensor surface in which a plurality of pixels is arranged in a matrix, and outputs an image acquired by the capturing.

The logic unit 22 supplies, to the signal processing circuit 17, image data in which positional information of the lens unit 12 and angular velocity data output from the OIS driver 15 are added together with timing information indicating timing to synchronize the aforementioned data with coordinates on the image to the image captured by the imaging unit 21.

Specifically, the logic unit 22 receives the angular velocity data detected by the motion sensor 14 and the positional information of the lens unit 12 driven by the OIS actuator 16 at a predetermined sampling frequency (for example, 1 kHz) from the OIS driver 15. Then, the logic unit 22 adds the positional information of the lens unit 12 and the angular velocity data, and an H line counter of the image data at the timing when the aforementioned data are received, to the image data, and outputs the image data. Of course, the positional information of the lens unit 12, the angular velocity data, and the H line counter may be individually output together with the image data without being added to the image data. In this way, the positional information of the lens unit 12 and the angular velocity data are associated in units of a horizontal line of the image data, so that the angular velocity data and the positional information, and a vertical position of the image can be synchronized in the signal processing circuit 17. That is, the H line counter is used as the timing information for synchronizing the data.

Here, for example, the H line counter of the image data is a counter that is reset for each frame at predetermined timing and increments every time a horizontal one line is read, and is used for timing the vertical position of the image. Note that the H line counter is counted in a blank section in which no image is read. Furthermore, as the timing information, time information such as a time stamp may be used, for example, other than use of the H line counter of the image data. Note that the method of synchronizing the angular velocity data and the positional information, and the vertical position of the image is described in detail in Patent Document 2 above.

The motion sensor 14 physically (not by image processing) detects a motion of the imaging unit 21 and outputs information indicating the motion. For example, in a case where the motion sensor 14 is configured by a gyro sensor capable of detecting angular velocities in three-axial directions, the motion sensor 14 outputs angular velocity data represented by the angular velocities as the information indicating the motion of the imaging device 11.

Note that, as the motion sensor 14, a single gyro sensor, a gyro sensor shared for OIS control (that is, having two ports), or the like can be used, for example, other than use of the gyro sensor for OIS control. Furthermore, the motion sensor 14 is not limited to a gyro sensor, and a six-axis sensor capable of outputting acceleration data and the like in addition to the angular velocity data in the three-axis directions can be used.

The OIS driver 15 calculates a moving amount for moving the lens unit 12 so as to optically cancel occurrence of a blur in the image captured by the imaging unit 21, on the basis of the angular velocity data output from the motion sensor 14. Then, the OIS driver 15 supplies the calculated moving amount to the OIS actuator 16, and performs control to arrange the lens unit 12 at a predetermined position according to the moving amount. Moreover, the OIS driver 15 acquires the positional information of the lens unit 12 driven by the OIS actuator 16, and outputs the positional information of the lens unit 12 and the angular velocity data to the image sensor 13.

The OIS actuator 16 drives the lens unit 12 according to the moving amount supplied from the OIS driver 15, thereby optically correcting camera shake occurring in the image captured by the image sensor 13. Then, the OIS actuator 16 detects the position of the lens unit 12 according to the driving, and supplies the positional information of the lens unit 12 to the OIS driver 15.

The signal processing circuit 17 is configured to perform correction processing similar to the electronic image stabilization proposed in Patent Document 2 while taking the positional information of the lens unit 12 into consideration. That is, the signal processing circuit 17 applies signal processing for correcting the influence of the motion of the imaging unit 21 on the image (for example, the positional deviation, peripheral deformation, distortion by the rolling shutter, deformation by the influence of the lens distortion, and the like) according to a function for performing correction on the basis of the positional information of the lens unit 12 and the angular velocity data synchronized for each coordinate on the image, on the basis of the positional information of the lens unit 12 and the angular velocity data added to the image data supplied from the image sensor 13. Note that the correction processing by the signal processing circuit 17 will be described below with reference to FIG. 14.

The display 18 includes a display unit such as a liquid crystal panel or an organic electro luminescence (EL) panel, for example, and displays an image output by the signal processing circuit 17.

The recording medium 19 is a memory built in the imaging device 11 or a memory removably attached to the imaging device (the memory is an electronically erasable and programmable read only memory (EEPROM), for example), and records the image output by the signal processing circuit 17.

The imaging device 11 is thus configured, and the signal processing circuit 17 can apply the correction processing by the electronic image stabilization to the image captured by the image sensor 13 such that occurrence of a blur is optically suppressed. Thereby, the imaging device 11 can suppress occurrence of the blur during the exposure time and reliably correct the blurs of the image (such as the positional deviation caused by camera shake, peripheral deformation, distortion by the rolling shutter, and deformation by the influence of lens distortion), as illustrated in FIG. 12 above.

Note that, in the present embodiment, the barrel shift optical image stabilizer in which the lens unit 12 is driven by the OIS actuator 16 is described. However, the imaging device 11 may adopt sensor shift optical image stabilizer in which the image sensor 13 is driven by the OIS actuator 16. In this case, the OIS actuator 16 supplies the positional information of the image sensor 13, instead of the positional information of the lens unit 12, to the OIS driver 15.

Furthermore, in the imaging device 11 in FIG. 13, the angular velocity data output from the motion sensor 14 is supplied to the image sensor 13 via the OIS driver 15. In contrast, the imaging device 11 may have a configuration in which the motion sensor 14 has two output ports used for outputting the angular velocity data, and the motion sensor 14 supplies the angular velocity data to the image sensor 13 and the OIS driver 15, for example. In this case, the angular velocity data is not supplied from the OIS driver 15 to the image sensor 13.

Alternatively, the imaging device 11 may include two motion sensors 14, for example. In this case, the two motion sensors 14 supply the angular velocity data to the image sensor 13 and the OIS driver 15. Also in this case, the angular velocity data is not supplied from the OIS driver 15 to the image sensor 13.

Moreover, in the imaging device 11 in FIG. 13, the image sensor 13 and the signal processing circuit 17 are illustrated as different blocks. However, a configuration in which the processing by the signal processing circuit 17 is performed inside the image sensor 13 may be adopted, for example. That is, the image sensor 13 can have a stacked structure in which the semiconductor chip on which the signal processing circuit 17 is formed is stacked.

The correction processing by the electronic image stabilization by the signal processing circuit 17 will be described with reference to FIG. 14.

Figure 14:
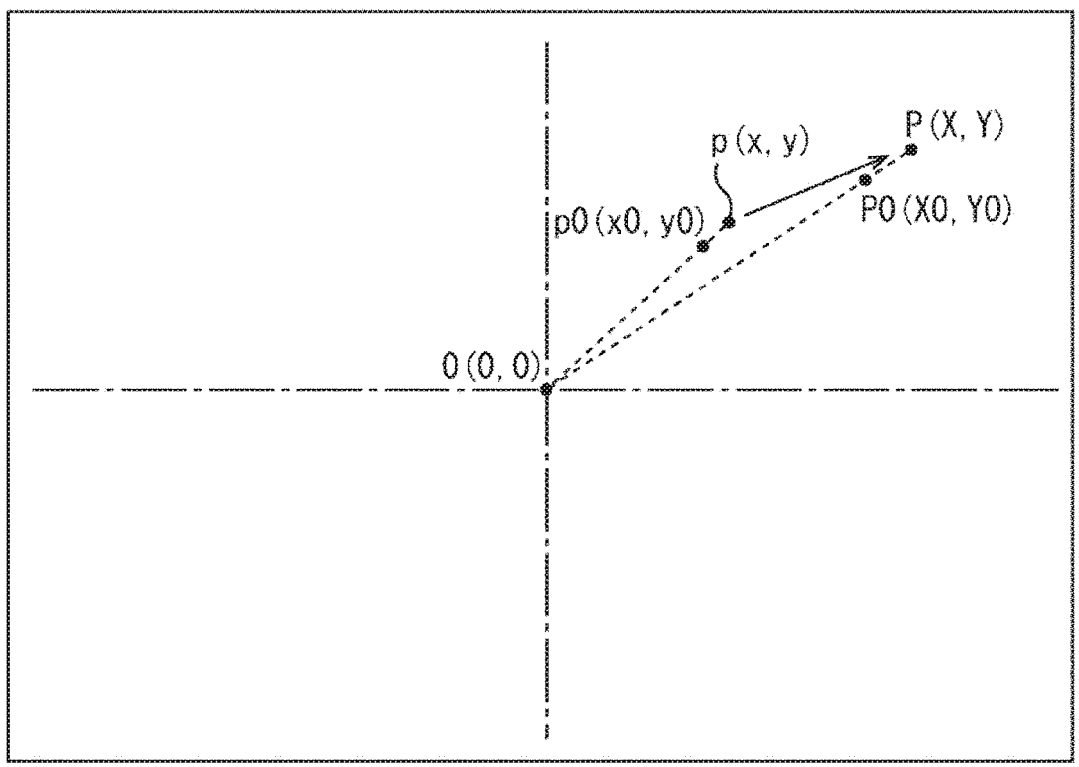
FIG. 14 is a graph for describing correction processing by electronic image stabilization by a signal processing circuit.

As illustrated in FIG. 14, an optical center of an output image by the image sensor 13 is a position O (0, 0). Then, it is assumed that the image sensor 13 rotates at a rotation angle $-\theta p$ (rad) in the pitch direction, at a rotation angle $-\theta y$ (rad) in the yaw direction, and at a rotation angle $-\theta r$ (rad) in the roll direction. It is assumed that a point p (x, y) captured on the image sensor 13 moves to a point P (X, Y) by such rotation.

Moreover, the image stabilization relational expression disclosed in Patent Document 1 above, that is, the following expressions (1) are established, where a point p0 (x0, y0) is coordinates of the point p (x, y) with corrected distortion, and a point P0 (X0, Y0) is coordinates of the point P (X, Y) with corrected distortion.

[Math. 1]

$$\begin{cases} X0 = L \cdot (\tan(\alpha + \theta_y)) + x0 \cdot \dfrac{\cos\beta}{\cos(\beta + \theta_p)} + \\ \quad x0 \cdot \cos\theta_r - y0 \cdot \sin\theta_r - 2 \cdot x0 \\ Y0 = L \cdot (\tan(\beta + \theta_p)) + y0 \cdot \dfrac{\cos\alpha}{\cos(\alpha + \theta_y)} + \\ \quad x0 \cdot \sin\theta_r + y0 \cdot \cos\theta_r - 2 \cdot y0 \end{cases} \quad (1)$$

$$\tan\alpha = \dfrac{x0}{L}$$

$$\tan\beta = \dfrac{y0}{L}$$

Note that, in the expressions (1), a focal length L is a focal length at an optical center position of the image sensor 13, which is converted into the number of pixels, and has a value that satisfies the following expression (2), using a moving amount d of the position O (0, 0) of the optical center when the image sensor 13 rotates at a rotation angle −θ in the pitch direction or the yaw direction.

[Math. 2]

$$d = L \cdot \tan\theta \quad (2)$$

Furthermore, the P0(X0, Y0) is expressed by the following expression (3), where the image stabilization relational expression of the above-described expression (1), that is, calculation of obtaining the point P0 (X0, Y0) from the point p0 (x0, y0) is a function T.

[Math. 3]

$$P0(X0,Y0) = T(x0,y0,L,\theta_p,\theta_y,\theta_r) \quad (3)$$

Moreover, the point p0 (x0, y0) is expressed by the following expression (4), where calculation of obtaining the point p0 (x0, y0) from the point p (x, y), that is, calculation of obtaining where a point on the image affected by the lens distortion is located in a case where there is no lens distortion is a function U.

[Math. 4]

$$p0(x0,y0) = U(x,y) \quad (4)$$

Furthermore, the point P (X, Y) is expressed by the following expression (5), where calculation of obtaining the point P (X, Y) from the point P0 (X0, Y0), that is, calculation of obtaining where on the image affected by the lens distortion a point on the image in the case where there is no lens distortion is located is a function D.

[Math. 5]

$$P(X,Y) = D(X0,Y0) \quad (5)$$

Then, for example, in the case of outputting a result with corrected lens distortion as illustrated in FIG. 8 by the correction processing by the signal processing circuit 17, a point on an output image may be regarded as the point p0 (x0, y0). That is, by using a pixel value of the point P (X, Y) as a pixel value of the point p0 (x0, y0), for each point in the output image, an image to which the image stabilization is applied and the lens distortion is corrected can be obtained.

At this time, the point P (X, Y) can be obtained from the point p0 (x0, y0), using the function T of the expression (3) and the function D of the expression (5). That is, the point P0 (X0, Y0) can be obtained from the point p0 (x0, y0) using the function T of the expression (3). Moreover, the point P (X, Y) can be obtained from the point P0 (X0, Y0), using the function D of the expression (5). Here, the point P (X, Y) is expressed by the following expression (6), where a composite function of the function T and the function D is a function F.

[Math. 6]

$$P(X,Y) = F(x0,y0,L,\theta_p,\theta_y,\theta_r) \quad (6)$$

Meanwhile, for example, in the case of outputting a result without corrected lens distortion as illustrated in FIG. 7 by the correction processing by the signal processing circuit 17, a point on an output image may be regarded as the point p (x, y). That is, by using the pixel value of the point P (X, Y) as the pixel value of the point p (x, y), for each point in the output image, an image to which the image stabilization is applied and the lens distortion is not corrected can be obtained.

At this time, the point P (X, Y) can be obtained from the point p (x, y), using the function T of the expression (3), the function U of the expression (4), and the function D of the expression (5). That is, the point p0 (x0, y0) can be obtained from the point p (x, y), using the function U of the expression (4). The point P0 (X0, Y0) can be obtained from the point p0 (x0, y0), using the function T of the expression (3). Moreover, the point P (X, Y) can be obtained from the point P0 (X0, Y0), using the function D of the expression (5). Here, the point P (X, Y) is expressed by the following expression (7), where a composite function of the function T, the function U, and the function D is a function G.

[Math. 7]

$$P(X,Y) = G(x,y,L,\theta_p,\theta_y,\theta_r) \quad (7)$$

Note that the coordinate value of the point P (X, Y) obtained by the expressions (6) or (7) rarely becomes an integer value, but the pixel value of the output image can be calculated from pixel values of the nearby coordinates by interpolation. Furthermore, to obtain the pixel value of each point of the output image, the pixel value can be calculated by calculating a corresponding coordinate position on an input image using the above-described functions for each point. Alternatively, for example, the pixel value may be calculated by dividing the output image, calculating corresponding coordinate positions on the input image for only grid points using the above-described functions, and obtaining coordinate positions for points other than the grid points by interpolation calculation.

Note that, here, to simply describe the principle, calculation of the pixel value at certain timing has been described. However, in reality, the capture time of a pixel in one screen is different depending on the pixel position. Therefore, the pixel value is calculated at each pixel using the pitch rotation angle −θp (rad), yaw rotation angle −θy (rad), and roll rotation angle −θr (rad) according to the pixel position.

By the way, by adding the moving amount for moving the lens unit 12 by the OIS actuator 16 to the correction processing by the function F of the expression (6) and the function G of the expression (7) above, the correction processing by the optical image stabilizer and the electronic image stabilization is implemented Hereinafter, the correction processing using the function F of the expression (6)

will be described. However, the correction processing using the function G of the expression (7) can also be implemented similarly to the correction processing using the function F of the expression (6)

First, assuming that coordinates on the input image (camera shake image in the case of no optical image stabilizer) corresponding to the coordinates of the point p0 (x0, y0) on the output image to which the correction processing by the optical image stabilizer and the electronic image stabilization is applied is the point P0 (X0, Y0). At this time, as described above, the function F for calculating the coordinates by the electronic image stabilization is expressed by the expression (6).

Furthermore, the correction processing by the optical image stabilizer (barrel shift method or sensor shift method) may be considered as parallel movement of the image. Coordinates $(X_{ois}, Y_{ois})$ on the input image corresponding to the coordinates p0 (x0, y0) on the output image are obtained by the following expression (8), using a shift amount $(x_{ois}, y_{ois})$ by the optical image stabilizer for each pixel, on the basis of the above assumption.

[Math. 8]

$$(X_{ois}, Y_{ois}) = (X, Y) - (x_{ois}, y_{ois})$$
$$= F(x0, y0, L, \theta_p, \theta_y, \theta_r) - (x_{ois}, y_{ois}) \quad (8)$$

Therefore, by outputting the pixel value of the coordinates $(X_{ois}, Y_{ois})$ on the input image as the pixel value of the coordinates (x0, y0) on the output image, an image to which the correction processing by the optical image stabilizer and the electronic image stabilization is applied can be output.

Note that the coordinate value of the coordinates $(X_{ois}, Y_{ois})$ obtained by the expression (8) rarely becomes an integer value, but the pixel value of the output image can be calculated from pixel values of the nearby coordinates by interpolation. Furthermore, to obtain the pixel value of each point of the output image, the pixel value can be calculated by calculating a corresponding coordinate position on an input image using the above-described functions for each point. Alternatively, for example, the pixel value may be calculated by dividing the output image, calculating corresponding coordinate positions on the input image for only grid points using the above-described functions, and obtaining coordinate positions for points other than the grid points by interpolation calculation.

Note that, here, to simply describe the principle, calculation of the pixel value at certain timing has been described. However, in reality, the capture time of a pixel in one screen is different depending on the pixel position. Therefore, the pixel value is calculated at each pixel using the pitch rotation angle $-\theta_p$ (rad), yaw rotation angle $-\theta_y$ (rad), roll rotation angle $-\theta_r$ (rad) according to the pixel position, and the shift amount by the optical image stabilizer.

Here, a case of using Hall data obtained by reading the position of the lens unit 12 using a Hall element as the positional information of the lens unit 12 driven in the optical image stabilizer will be described. For example, the logic unit 22 can add the angular velocity data detected by the motion sensor 14 and the Hall data obtained by reading the position of the lens unit 12 together with the H line counter of the image data to the image data, and output the image data. At this time, the logic unit 22 adjusts timing to synchronize delay time to timing when the motion sensor 14 has detected the angular velocity data and to timing when the Hall element has read the position of the lens unit 12, an exposure end time, and an exposure time for each pixel (H line), with the acquisition timing of the angular velocity data and the Hall data, on the basis of the relationship among the aforementioned times and the like.

In this case, the coordinates (x0, y0) on the output image (image after the image stabilization) are obtained by the following expression (9), using the shift amount $(x_{ois}, y_{ois})$ by the optical image stabilizer, a Hall data value (hx, hy), Hall data (hx0, hy0) of when the lens unit 12 is located in the center by the optical image stabilizer, and a pixel number conversion coefficient (kx, ky).

[Math. 9]

$$(x_{ois}, y_{ois}) = (kx \cdot (hx - hx0), ky \cdot (hy - hy0)) \quad (9)$$

Then, by inputting the shift amount $(x_{ois}, y_{ois})$ obtained by the expression (9) to the above expression (8), the coordinates $(X_{ois}, Y_{ois})$ on the input image (OIS output image) corresponding to the coordinates p0 (x0, y0) on the output image (image after the image stabilization) are determined. Thereby, an image stabilization image can be created by using the pixel value of the coordinates. Here, the expression (9) indicates an example of a case where conversion processing is performed assuming that a change amount of the Hall data (hx0, hy0) and the moving amount of the pixel position have a linear relationship. In contrast, in a case where there is no linear relationship, for example, conversion processing according to the relationship between the change amount of the Hall data (hx0, hy0) and the moving amount of the pixel position is performed.

Note that, to obtain the pixel value of each point of the output image, the pixel value can be calculated by calculating a corresponding coordinate position on an input image using the above-described function for each point. Alternatively, for example, the pixel value may be calculated by dividing the output image, calculating corresponding coordinate positions on the input image for only grid points using the above-described functions, and obtaining coordinate positions for points other than the grid points by interpolation calculation.

Note that, here, to simply describe the principle, calculation of the pixel value at certain timing has been described. However, in reality, the capture time of a pixel in one screen is different depending on the pixel position.

Therefore, the pixel value is calculated at each pixel using the pitch rotation angle $-\theta_p$ (rad), yaw rotation angle $-\theta_y$ (rad), roll rotation angle $-\theta_r$ (rad) according to the pixel position, and the shift amount (Hall data value (hx, hy)) by the optical image stabilizer.

<Image Stabilization Processing of Imaging Device>

Figure 15:
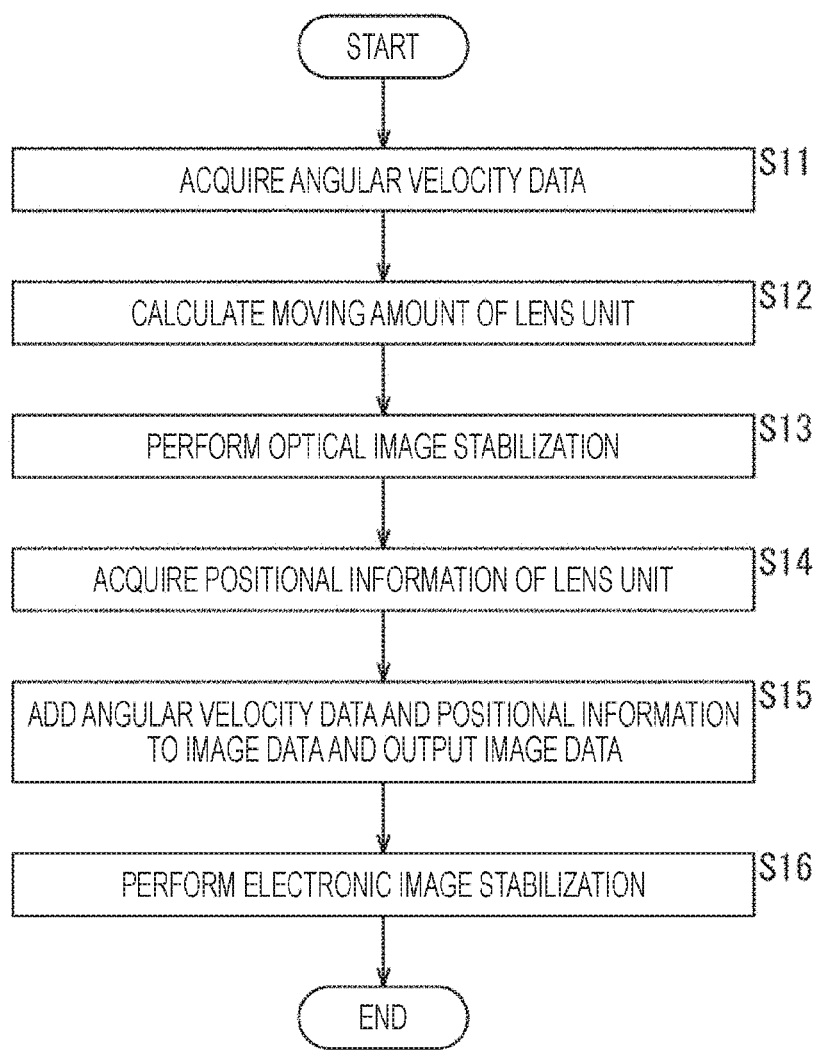
FIG. 15 is a flowchart for describing image stabilization processing executed in an imaging method by the imaging device.

An example of the image stabilization processing executed in an imaging method by the imaging device 11 will be described with reference to the flowchart in FIG. 15.

For example, in the imaging device 11, when the imaging unit 21 starts imaging of one frame, the image stabilization processing is started. In step S11, the OIS driver 15 acquires the angular velocity data output from the motion sensor 14.

In step S12, the OIS driver 15 calculates the moving amount for moving the lens unit 12 on the basis of the angular velocity data acquired in step S11, and supplies the moving amount to the OIS actuator 16.

In step S13, the OIS actuator 16 drives the lens unit 12 according to the moving amount supplied from the OIS driver 15 in step S12, thereby performing the optical image stabilization.

In step S14, the OIS actuator 16 detects the position of the lens unit 12 driven in step S13, and supplies the positional information of the lens unit 12 to the OIS driver 15. Then, the OIS driver 15 supplies the positional information of the lens unit 12 and the angular velocity data acquired in step S11 to the logic unit 22 of the image sensor 13.

In step S15, the logic unit 22 adds the positional information of the lens unit 12 supplied from the OIS driver 15 in step S14 and the angular velocity data together with the H line counter of the image data corresponding to reception timing of the positional information and the angular velocity data to the image data output from the imaging unit 21, and supplies the image data to the signal processing circuit 17.

In step S16, the signal processing circuit 17 performs the electronic image stabilization processing for the image data supplied in step S15 according to the function for converting the position for each coordinate of the image data synchronized with the positional information of the lens unit 12 and the angular velocity data, using the positional information and the angular velocity data. Thereafter, the processing is terminated, and similar processing is repeatedly performed every time the next imaging of one frame is started by the imaging unit 21. Note that the correction processing is continuously performed without termination, in capturing of a moving image and the like, a preview screen, or continuous capturing of still images for which image stabilization is continuously performed. Furthermore, the processing from steps S11 to S14 is continuously performed at a preset sampling frequency.

As described above, the imaging device 11 can suppress occurrence of a blur during the exposure time by the optical image stabilization under the control of the OIS driver 15, and can suppress the influence of camera shake on an image and reliably correct the blur by the electronic image stabilization processing by the signal processing circuit 17.

Correction results of an image captured by the imaging device 11 by such an imaging method will be described with reference to FIG. 16.

For example, it is assumed that an angle that can be corrected by the optical image stabilizer is ±1.5 degrees and an angle that can be corrected by the electronic image stabilization is ±6 degrees. At this time, the correction result by the optical image stabilizer (OIS) with respect to the vibration as illustrated in FIG. 16 shows suppression of the blur during the exposure time by correcting only a high frequency component. Then, the correction result of the optical image stabilizer (OIS) and the electronic image stabilization (EIS) can be maintained at almost 0 degrees by correcting a low frequency component.

As described above, the imaging device 11 can perform imaging while performing the correction processing by the optical image stabilizer, and can perform the electronic image stabilization for the captured image, using the positional information of the lens unit 12 (information of the optical image stabilizer) and the angular velocity data. Thereby, the imaging device 11 can perform the image stabilization corresponding to the difference in the moving amount depending on the position in an image plane or the difference in the moving amount due to deviation of the exposure timing in one screen.

Therefore, the imaging device 11 can correct the influence of the peripheral deformation, lens distortion, and the rolling shutter and can accurately correct the camera shake from the center to the periphery while suppressing occurrence of the blur during the exposure time not only in imaging performed outdoors during the daytime or the like with a short exposure time but also in imaging performed in a dark place, during the night time, or the like with a long exposure time.

Furthermore, in general, to increase a correction range in the optical image stabilizer, the device needs to be made large or large power is required for control. Thus, it has been difficult to increase the correction range. In contrast, the imaging device 11 can perform correction of a wider range by compensating for a range not corrected by the optical image stabilizer by the electronic image stabilization. Moreover, it is difficult for the optical image stabilizer to perform correction in a rotation direction, whereas the imaging device 11 can perform correction in the rotation direction.

Figure 16:
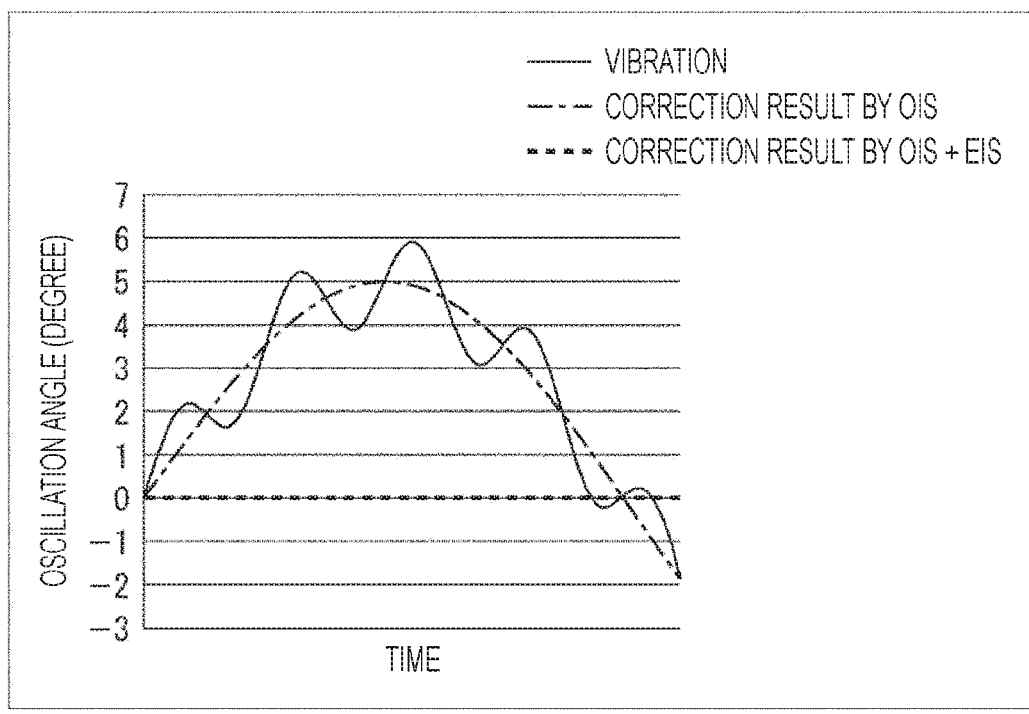
FIG. 16 is a graph for describing image correction results.

Note that FIG. 16 illustrates an example of a technique for stopping all the vibrations by the electronic image stabilization for easy understanding of the effects of the image stabilization. In addition, examples of the technique for suppressing the vibration by the electronic image stabilization include a technique for attenuating the vibration to the extent that movement of a moving image becomes smooth, a technique for not stopping the vibration at all, and other techniques, and each technique can be appropriately selected.

<Configuration Example of Imaging Device to Which Present Technology is Applied>

Figure 17:
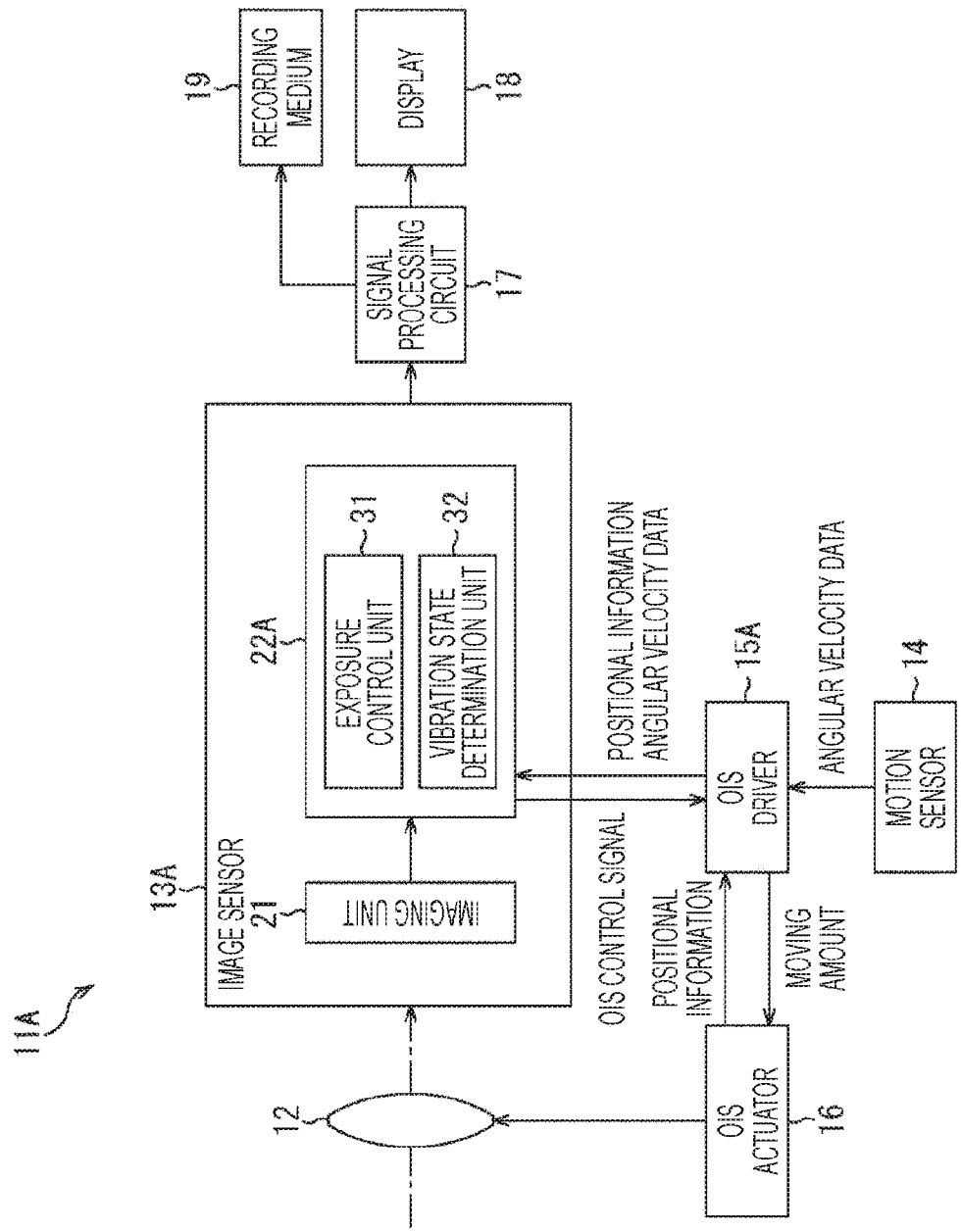
FIG. 17 is a block diagram illustrating a configuration example of an embodiment of an imaging device to which the present technology is applied.

FIG. 17 is a block diagram illustrating a configuration example of an embodiment of an imaging device to which the present technology is applied. Note that, in an imaging device 11A illustrated in FIG. 17, configurations common to the imaging device 11 in FIG. 13 are denoted by the same reference numerals and detailed description of the configurations is omitted.

As shown in FIG. 17, the imaging device 11A includes the lens unit 12, the motion sensor 14, the OIS actuator 16, the signal processing circuit 17, the display 18, the recording medium 19, and the imaging unit 21, similarly to the imaging device 11 in FIG. 13.

Then, in the imaging device 11A, a logic unit 22A of an image sensor 13A and an OIS driver 15A have different configurations from those of the imaging device 11 in FIG. 13. The logic unit 22A has a function to generate an OIS control signal to be described below in addition to the function of the logic unit 22 in FIG. 13, and further includes an exposure control unit 31 and a vibration state determination unit 32.

The logic unit 22A generates the OIS control signal for giving an instruction on execution or stop of the optical image stabilizer according to exposure timing when the imaging unit 21 performs exposure, and supplies the OIS control signal to the OIS driver 15A. In a case where the logic unit 22A determines that a non-exposure period calculated from the exposure timing is longer than a predetermined threshold period (a time required for resetting a relative positional relationship between the position of the lens unit 12 and the position of the imaging unit 21 (returning the relative positional relationship to the center) and next starting the OIS control), the logic unit 22A generates the OIS control signal for resetting the OIS control during the non-exposure period and starting the OIS control immediately before the start of exposure. As described above, the processing of generating the OIS control signal according to the exposure timing of the imaging unit 21 is favorably performed in the logic unit 22A built in the image sensor 13A.

For example, the logic unit 22A generates the OIS control signal on the basis of the exposure end (read end) timing of the imaging unit 21, the exposure start timing of the next frame, and the threshold period. Furthermore, the logic unit 22A can specify the exposure start timing of the next frame on the basis of information such as a time between frames and an exposure time (that changes according to capture conditions such as an automatic exposure function) of the next frame Since the aforementioned timing is determined and operated inside the image sensor 13A, the OIS control signal can be more easily generated in the logic unit 22A than a configuration in which the OIS control signal is generated outside the image sensor 13A.

In a case where the OIS control signal gives an instruction on stop of the optical image stabilizer on the basis of the OIS control signal supplied from the logic unit 22A, the OIS driver 15A performs an operation of returning the lens unit 12 to the center position.

The imaging device 11A thus configured can perform the center return processing by the optical image stabilizer between frames when the logic unit 22A supplies the OIS control signal to the OIS driver 15A. Thereby, the imaging device 11A can perform the optical image stabilizer while resetting the lens position between frames, thereby performing, for each frame, correction using the entire range of angles correctable by the optical image stabilizer on a steady basis.

That is, in a case where vibration of amplitude exceeding an angle correctable by the optical image stabilizer occurs, the imaging device 11 in FIG. 13 cannot suppress the blur during the exposure time, during the vibration in the exceeding range. In contrast, the imaging device 11A performs the center return processing by the optical image stabilizer, thereby suppressing occurrence of the blur during the exposure time if the vibration in one frame falls within the angle correctable by the optical image stabilizer.

For example, in a case where the exposure time of the imaging unit 21 is set long and the non-exposure period is shorter than the threshold period, the logic unit 22A does not give an instruction on resetting of the relative positional relationship between the position of the lens unit 12 and the position of the imaging unit 21. Meanwhile, in a case where the exposure time of the imaging unit 21 is set such that the non-exposure period becomes longer than the threshold period, the logic unit 22A gives an instruction on resetting of the relative positional relationship between the position of the lens unit 12 and the position of the imaging unit 21. By controlling the exposure time of the imaging unit 21 as described above, the logic unit 22A can control the OIS control signal.

Therefore, in the case where the exposure time is long and the center return processing by the optical image stabilizer is not performed in the logic unit 22A, the imaging device 11A determines a vibration state in a case where the vibration in one frame exceeds the angle correctable by the optical image stabilizer and controls the exposure time, thereby performing the center return processing by the optical image stabilizer. Thereby, the image stabilization by the optical image stabilizer works in each frame, and the imaging device 11A can prevent occurrence of the exposure blur.

That is, the vibration state determination unit 32 of the logic unit 22A determines the vibration state of the imaging device 11A on the basis of the lens positional information (Hall data) of the optical image stabilizer, a gyro signal (angular velocity data) output from the motion sensor 14, and the like. For example, the vibration state determination unit 32 determines that the vibration state is a first vibration state in a case where the vibration in one frame is in a gentle state within the correctable range by the optical image stabilizer, and determines that the vibration state is a second vibration state (a first exposure time control mode to be described below) in a case where the vibration is in a state exceeding the correctable range. Moreover, the vibration state determination unit 32 determines that the vibration state is a third vibration state (a second exposure time control mode to be described below) in a case where the vibration in one frame is in a more intense state than the vibration in the second vibration state.

Then, the exposure control unit 31 of the logic unit 22A performs exposure control for the imaging unit 21 under the imaging conditions according to the determination result of the vibration state of the imaging device 11A by the vibration state determination unit 32. For example, the exposure control unit 31 determines the exposure time in which the imaging unit 21 performs exposure and sets the determined exposure time for the imaging unit 21, and determines a gain (analog gain and digital gain) for the image acquired by the imaging unit 21 in the exposure time and sets the gain for the imaging unit 21.

Note that the function to adopt a maximum value of the exposure time allowed within a frame rate as a maximum exposure time regardless of the vibration state, and obtain an optimum exposure time and an optimum gain such that an image with optimum brightness can be captured by the imaging unit 21, on the basis of the image output from the imaging unit 21, information of an illuminance sensor (not illustrated), and the like, is included in the imaging device 11 in FIG. 13 although no illustration and description are given. Since the present technology is characterized in controlling the exposure time according to the vibration state, description is given as an individual function in the imaging device 11A.

In the first vibration state, the exposure control unit 31 obtains the optimum exposure time and the optimum gain in which an image with optimum brightness can be captured, and sets the obtained optimum exposure time and optimum gain for the imaging unit 21 as the imaging conditions. For example, the exposure control unit 31 adopts the maximum value of the exposure time as the maximum exposure time allowed within a frame rate, and can obtain the optimum exposure time and the optimum gain such that an image with optimum brightness can be captured by the imaging unit 21, on the basis of the image output from the imaging unit 21, the information of an illuminance sensor (not illustrated), and the like.

In the second vibration state, the exposure control unit 31 adopts a first threshold exposure time (see FIG. 20) as a maximum value, in which the non-exposure period can be secured, in which the relative positional relationship between the position of the lens unit 12 and the position of the imaging unit 21 can be reset (returned to the center), determines an exposure time and a gain, and sets the determined exposure time and gain for the imaging unit 21. For example, in a case where the optimum exposure time in the first vibration state is longer than the first threshold exposure time, the exposure control unit 31 sets the first threshold exposure time as the exposure time. Then, the exposure control unit 31 increases the gain from the optimum gain to compensate for the shortage of brightness due to the shortened exposure time, and obtains a gain such that an image with brightness can be obtained, the brightness being equivalent to the case where an image is captured with the optimum exposure time and optimum gain in the first vibration state. Meanwhile, in a case where the optimum exposure time in the first vibration state is shorter than the first threshold exposure time, the exposure control unit 31 uses the optimum exposure time and the optimum gain in the first vibration state as they are.

Moreover, in the third vibration state, the exposure control unit 31 adopts a second threshold exposure time (see FIG. 22) shorter than the first threshold exposure time as the maximum value, determines an exposure time and a gain, and sets the determined exposure time and gain for the imaging unit 21. For example, in a case where the optimum exposure time in the first vibration state is longer than the second threshold exposure time, the exposure control unit 31 sets the second threshold exposure time as the exposure time. Then, the exposure control unit 31 increases the gain from the optimum gain to compensate for the shortage of brightness due to the shortened exposure time, and obtains a gain such that an image with brightness can be obtained, the brightness being equivalent to the case where an image is captured with the optimum exposure time and optimum gain in the first vibration state. Meanwhile, in a case where the optimum exposure time in the first vibration state is shorter than the second threshold exposure time, the exposure control unit 31 uses the optimum exposure time and the optimum gain in the first vibration state as they are.

Here, determination of the vibration state by the vibration state determination unit 32, exposure control by the exposure control unit 31, and OIS control information generated by the logic unit 22A will be described with reference to FIGS. 18 to 22.

Figure 18:
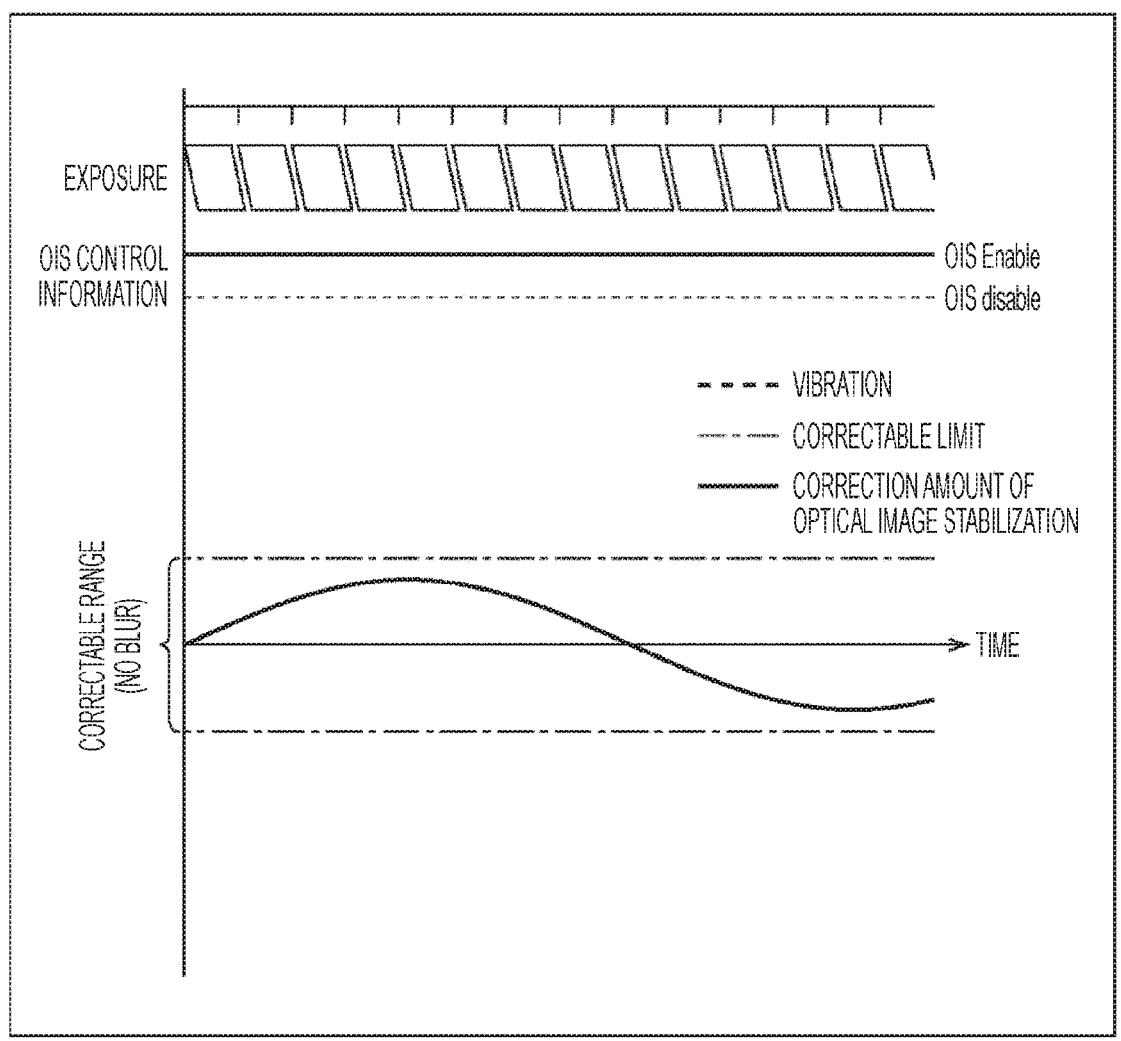
FIG. 18 is a diagram for describing exposure control and OIS control information in a first vibration state.

FIG. 18 illustrates an example of the exposure control and the OIS control information in the first vibration state in which vibration in one frame falls within a range (no blur) correctable by the optical image stabilizer.

For example, in a case where the proper exposure time calculated on the basis of the image output from the imaging unit 21, the information of an illuminance sensor (not illustrated), and the like is longer than the first threshold exposure time, imaging is performed using control of the normal optical image stabilizer with the proper exposure time when the vibration is gentle. Therefore, as illustrated in FIG. 18, in the first vibration state where the vibration is gentle within the correctable range by the optical image stabilizer, the vibration and a corrected amount by the optical image stabilizer overlap, and the exposure blur does not occur. Furthermore, at this time, exposure is performed with the optimum exposure time, and the logic unit 22A outputs the OIS control information (OIS enable) for giving an instruction on execution of the optical image stabilizer on a steady basis and does not perform the center return processing by the optical image stabilizer.

Figure 19:
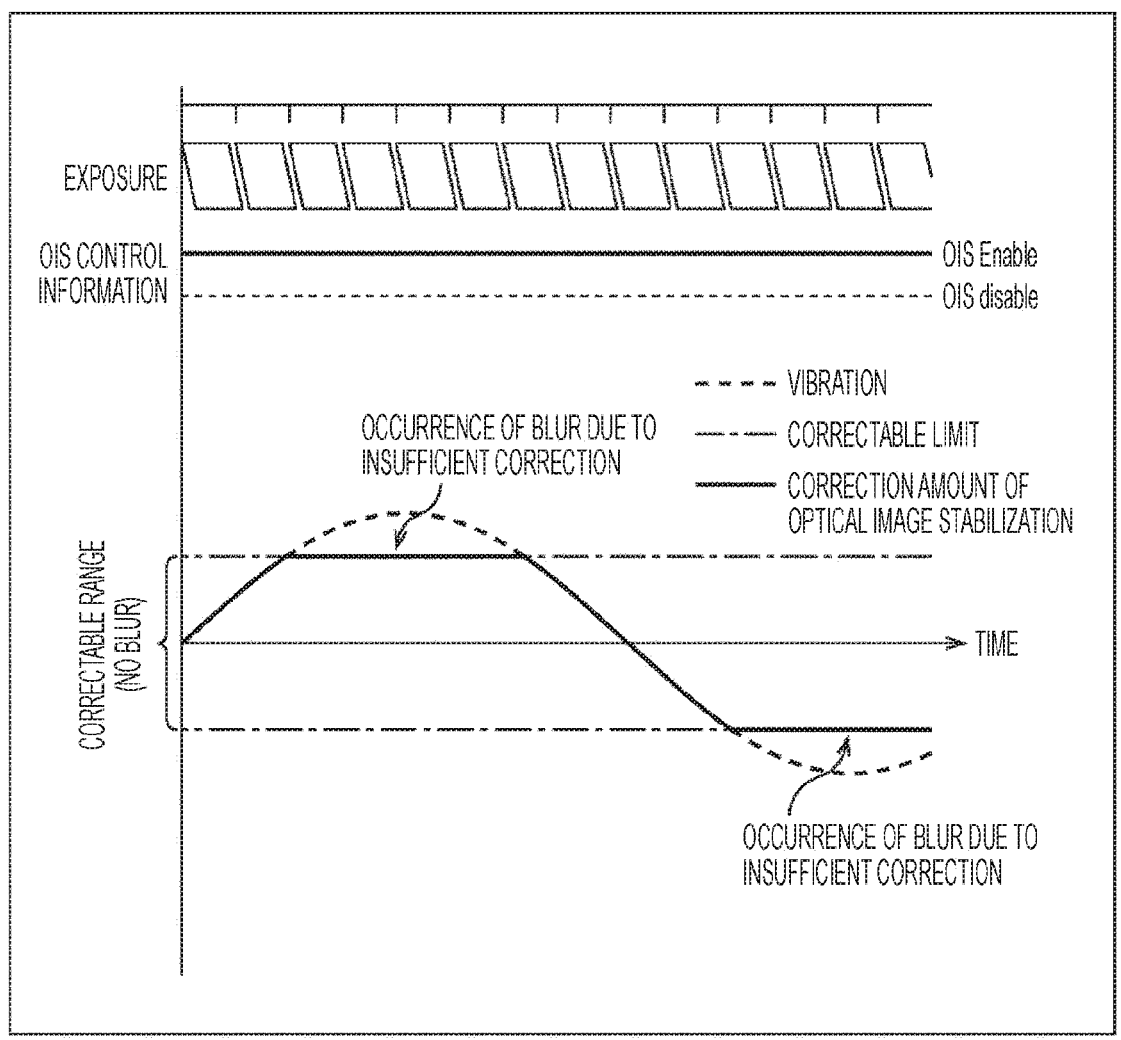
FIG. 19 is a diagram for describing vibration that exceeds a correctable range when the exposure control in the first vibration state is being performed.

In contrast, as illustrated in FIG. 19, in a case where the vibration is so intense as to exceed the correctable range by the optical image stabilizer, the vibration cannot be completely corrected by the optical image stabilizer and the exposure blur occurs.

Figure 20:
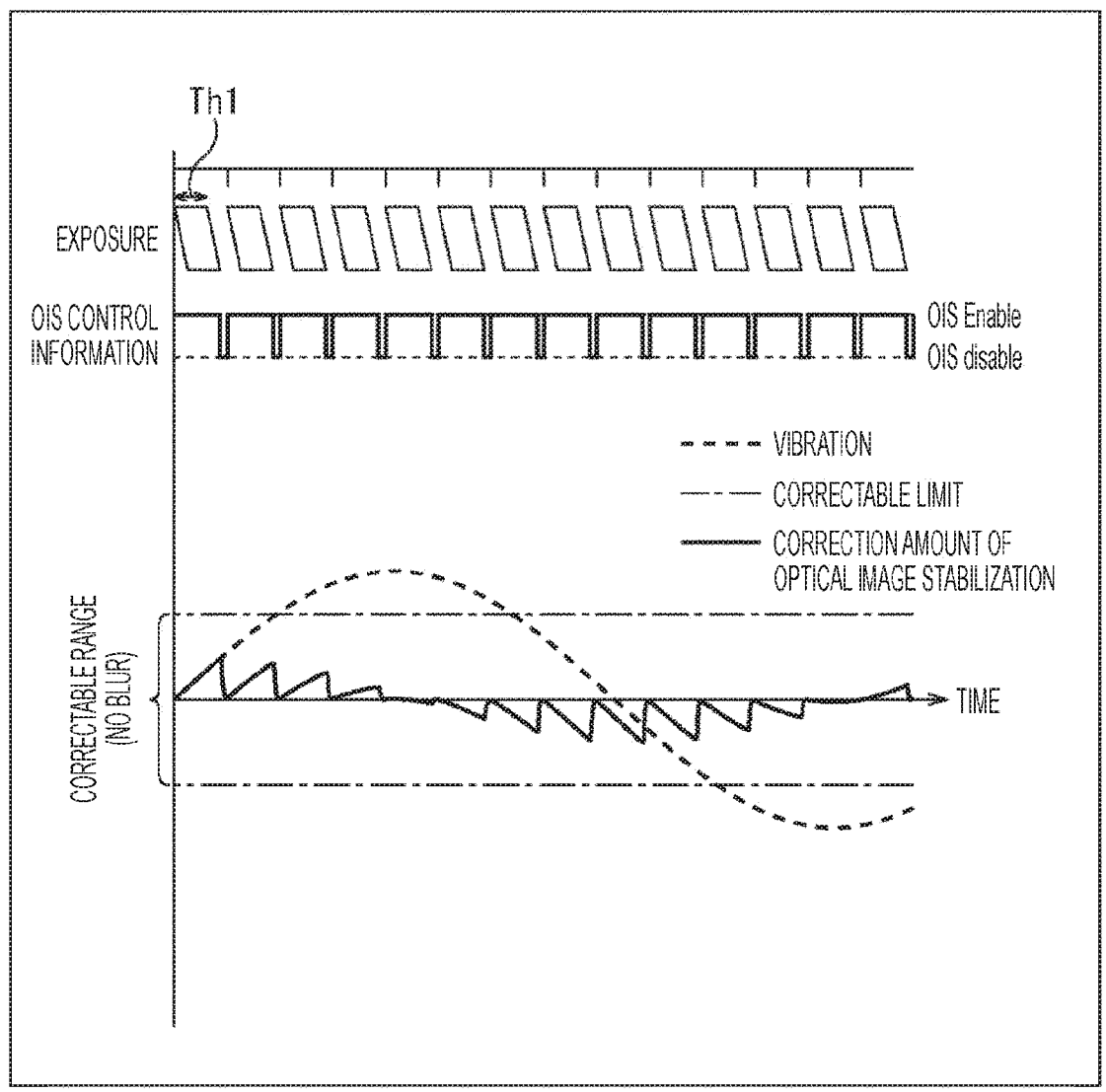
FIG. 20 is a diagram for describing exposure control and OIS control information in a second vibration state.

Therefore, when the vibration state as in FIG. 19 is determined to be the second vibration state, the exposure control unit 31 sets the first threshold exposure time as the exposure time and performs imaging. Thereby, as illustrated in FIG. 20, the logic unit 22A outputs the OIS control information (OIS enable) for giving an instruction on execution of the optical image stabilizer in the period where exposure is performed, and outputs the OIS control information (OIS disable) for giving an instruction on stop of the optical image stabilizer in the period where no exposure is performed.

Thereby, the control of resetting the relative positional relationship between the position of the lens unit 12 and the position of the imaging unit 21 in the non-exposure period, and executing the optical image stabilizer in the exposure period can be performed. Therefore, even in the vibration exceeding the correctable range by the optical image stabilizer, as illustrated by the broken line in FIG. 20, occurrence of the exposure blur can be avoided and an image without a blur by the optical image stabilizer can be captured.

Note that, since a change in the position and deformation of the image are caused between frames as the output result of the optical image stabilizer at this rate, the image stabilization technology described with reference to the imaging device 11 in FIG. 13 is used. That is, the influence of the motion of the imaging unit 21 on the image is corrected according to a function for converting the position on the basis of relative positional information with respect to the lens unit 12 or the imaging unit 21 synchronized for each coordinate on the image and motion information indicating the motion of the physically detected imaging unit 21. Thereby, the imaging device 11A can correct the positional deviation or deformation between frames and can obtain an image in which the influence of the positional deviation, deformation, and exposure blur due to the camera shake is corrected.

At this time, it is possible to prevent the image from becoming dark by capturing the image with an increased gain (sensitivity) by the amount of a shortened exposure time. However, as a result, noise slightly increases with the increase in the gain. However, it is possible to further improve overall image quality by suppressing deterioration of the image quality due to the exposure blur caused by intense vibration rather than suppressing deterioration of the image quality due to the slight increase in noise with the increase in the gain.

Note that, in the case where the proper exposure time calculated on the basis of the image output from the imaging unit 21, the information of an illuminance sensor (not illustrated), and the like is shorter than the first threshold exposure time, the logic unit 22A outputs the OIS control information (OIS enable) for giving an instruction on execution of the optical image stabilizer in the period where exposure is performed, and outputs the OIS control information (OIS disable) for giving an instruction on stop of the optical image stabilizer in the period where no exposure is performed, regardless of whether the vibration is gentle or intense. As a result, the center return processing by the optical image stabilizer is performed, and correction can be performed such that no exposure blur occurs.

Therefore, the imaging device 11A can capture an image without a blur by the optical image stabilizer even when the optimum exposure time is longer than the first threshold exposure time, and can correct the influence of the motion of the imaging unit 21 on the image, similarly to the imaging device 11 in FIG. 13. That is, the imaging device 11A can acquire an image without positional deviation, peripheral deformation, distortion due to the rolling shutter, deformation due to the influence of lens distortion, and the like.

Figure 21:
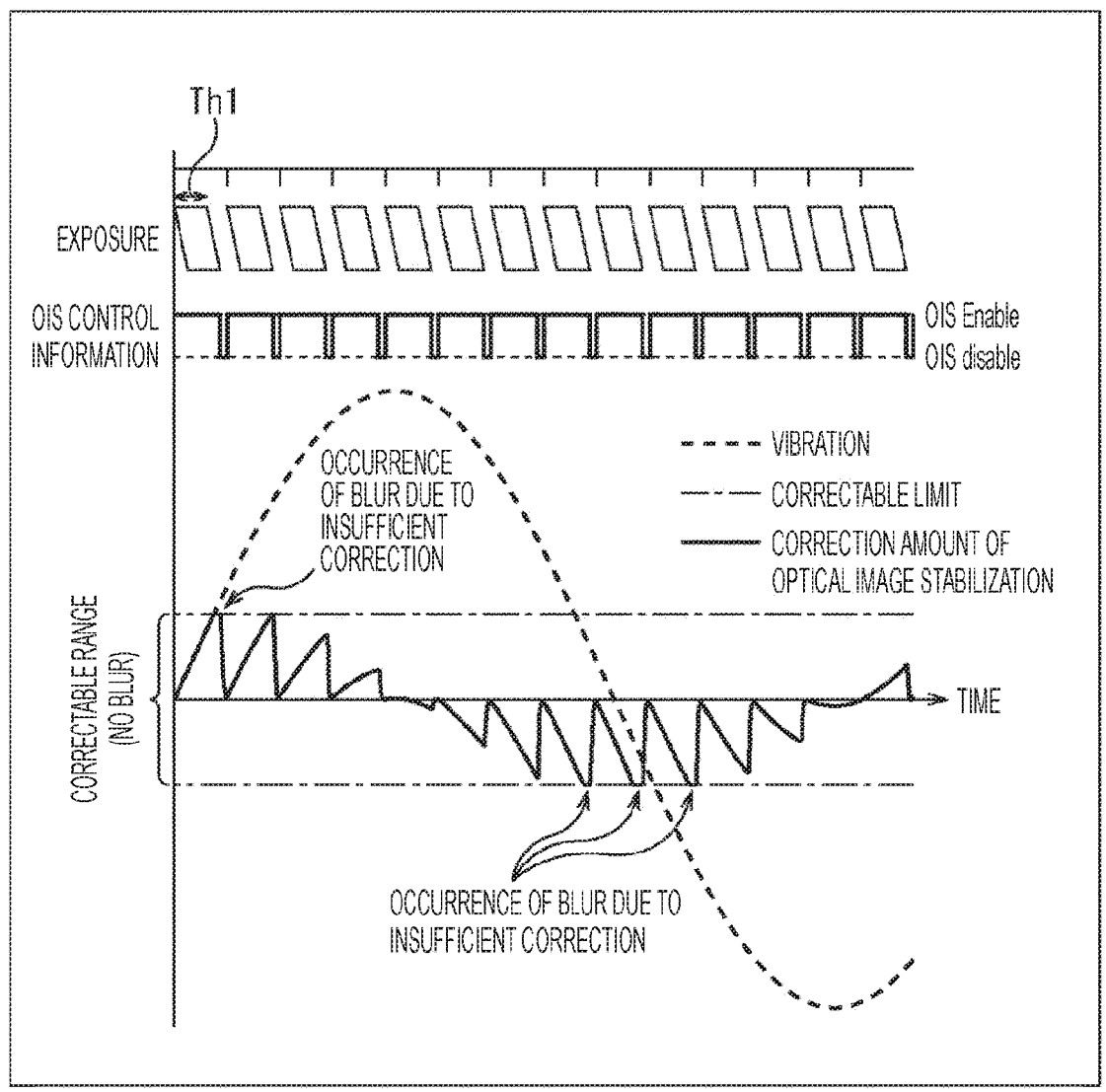
FIG. 21 is a diagram for describing vibration that exceeds a correctable range when the exposure control in the second vibration state is being performed.

Moreover, as illustrated in FIG. 21, in the case of the vibration so intense as to exceed the correctable range by the optical image stabilizer during the exposure period of one frame according to the first threshold exposure time, correction by the optical image stabilizer exceeds a correction limit during the exposure period even if the center return processing by the optical image stabilizer is performed, and thus the exposure blur occurs.

Figure 22:
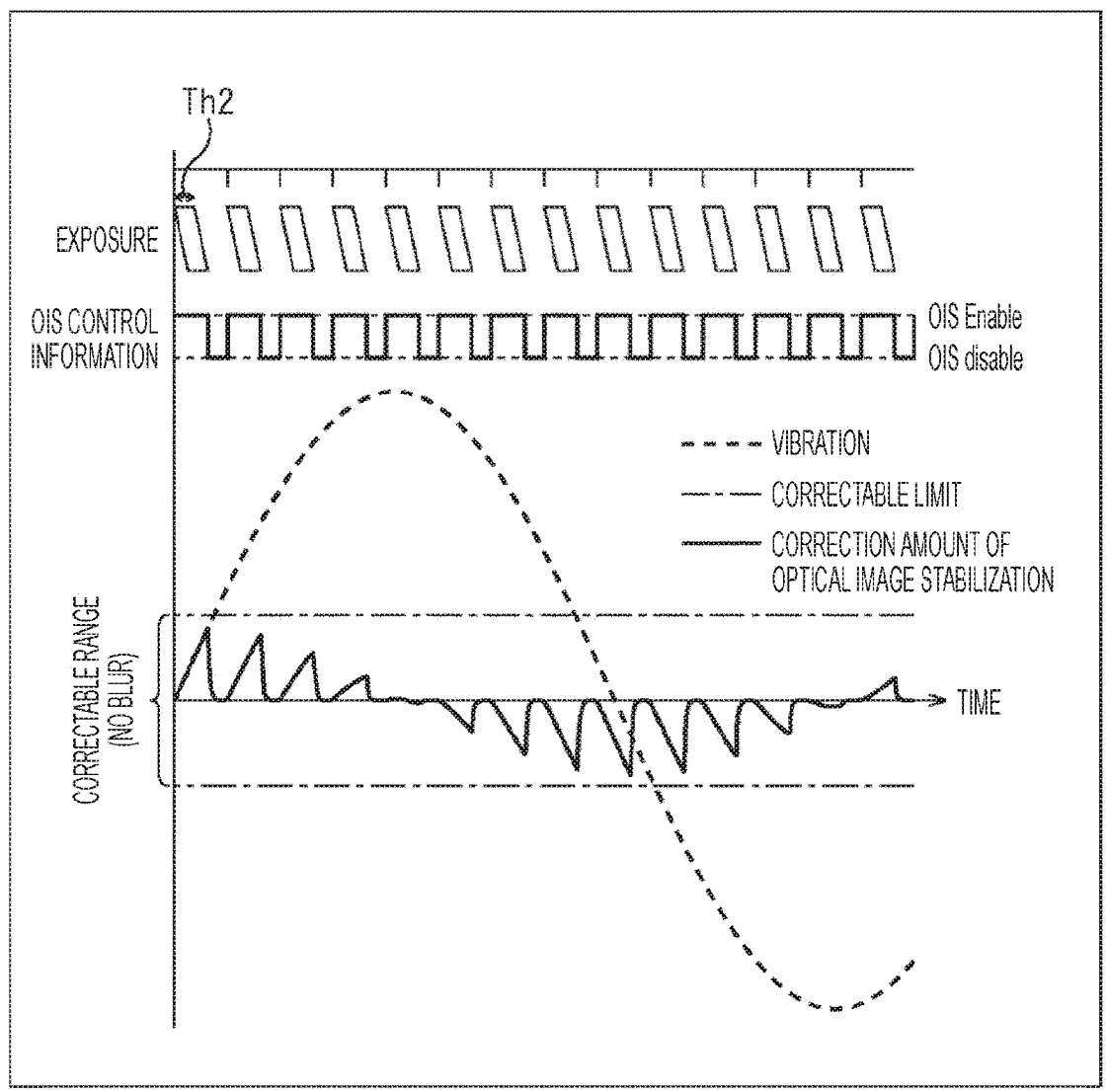
FIG. 22 is a diagram for describing exposure control and OIS control information in a third vibration state.

Therefore, when the vibration state as in FIG. 21 is determined to be the third vibration state, the exposure control unit 31 sets the second threshold exposure time as the exposure time and performs imaging with the second threshold exposure time further shorter than the first threshold exposure time (FIG. 21), as illustrated in FIG. 22. By performing the imaging with the second threshold exposure time as described above, the vibration amount during the exposure period becomes small. Therefore, the correction by the optical image stabilizer does not exceed the correction limit during the exposure period, and an image without a blur by the optical image stabilizer can be captured while avoiding occurrence of the exposure blur.

Note that, in the imaging device 11A, in a case where the analog gain or the digital gain in the image sensor 13A is not sufficient, the signal processing circuit 17 may adjust the insufficient gain. Furthermore, in the present embodiment, the optimum exposure time and the optimum gain, and the exposure time and the gain adjusted according to the determination result by the vibration state determination unit 32 are distinguished.

Then, the imaging device 11A performs imaging while performing the center return processing by the optical image stabilizer as described above, and applies the electronic image stabilization based on the angular velocity information and the relative positional information between the position of the lens unit 12 and the position of the imaging unit 21 to the image without the exposure blur corrected by the optical image stabilizer, similarly to the imaging device 11 in FIG. 13, thereby correcting the influence of the motion of the imaging unit 21 on the image. Thereby, the imaging device 11A can acquire an image without the positional deviation, peripheral deformation, distortion due to the rolling shutter, deformation due to the influence of lens distortion, and the like without occurrence of the exposure blur.

<First Exposure Time Control Mode>

Figure 23:
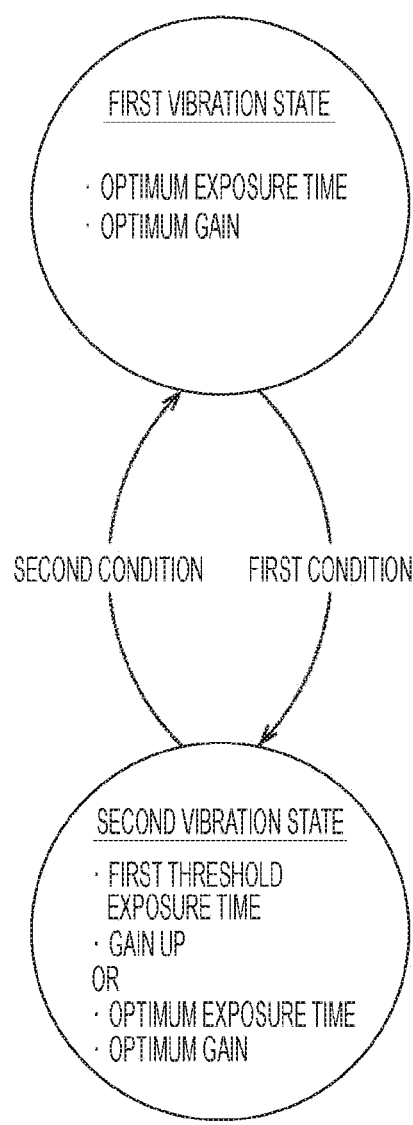
FIG. 23 is a diagram for describing an example of transition of a vibration state in a first exposure time control mode.

Switching of the imaging conditions in the first exposure time control mode will be described with reference to FIG. 23. Here, in the first exposure time control mode, the vibration state determination unit 32 determines whether the vibration of the imaging device 11A is the first vibration state or the second vibration state.

The vibration state determination unit 32 determines, for each one frame, whether or not the vibration state of the imaging device 11A has reached a predetermined condition, and notifies the exposure control unit 31 of a determination result based on the determination.

For example, in the first exposure time control mode in the imaging device 11A, reaching a situation where a state where the vibration of the imaging device 11A exceeds a first threshold has occurred a predetermined number of times or more during a predetermined period, is set as a first condition for determining the vibration state of the imaging device 11A. Furthermore, reaching a situation where a state where the vibration of the imaging device 11A falls below a second threshold has occurred a predetermined number of times or more in succession, is set as a second condition for determining the vibration state of the imaging device 11A.

Furthermore, as the imaging conditions in the first vibration state, the optimum exposure time and the optimum gain are used. Here, the maximum value of the exposure time is adopted as the maximum exposure time allowed within a frame rate, and the optimum exposure time is obtained such that an image with optimum brightness can be captured by the imaging unit 21 on the basis of the image output from the imaging unit 21, the information of an illuminance sensor (not illustrated), and the like. Furthermore, the optimum gain is obtained to optimize the brightness of the image captured with the optimum exposure time.

Moreover, as imaging conditions in a second vibration state, in a case where the optimum exposure time in the first vibration state is longer than a first threshold exposure time, the exposure time is set as the first threshold exposure time, and the value of the gain is set according to the exposure time. Alternatively, in a case where the optimum exposure time in the first vibration state is shorter than the first threshold exposure time, the optimum exposure time and the optimum gain in the first vibration state are set as they are as the imaging conditions (an imaging condition determination rule in the second vibration state). The first threshold exposure time is determined to secure the non-exposure period in which the relative positional relationship between the position of the lens unit 12 and the position of the imaging unit 21 can be reset (can be returned to the center). Furthermore, in the case where the exposure time becomes shorter than the optimum exposure time, the gain is increased from the optimum gain to compensate for the shortage of brightness due to the shortened exposure time, and is obtained to be able to acquire an image with brightness equivalent to an image captured with the optimum exposure time and optimum gain.

First, in the imaging device 11A, use of the first vibration state as an initial setting is set in the vibration state determination unit 32 at the start of imaging, and the vibration state determination unit 32 notifies the exposure control unit 31 of the first vibration state as a determination result of the vibration state of the imaging device 11A. Accordingly, the exposure control unit 31 sets the above-described optimum exposure time and optimum gain for the imaging unit 21 as the imaging conditions in the first vibration state, and the imaging unit 21 performs imaging Then, in a case where the vibration state determination unit 32 continues determination that the vibration state of the imaging device 11A has not reached the first condition in the first vibration state, the imaging unit 21 in the imaging device 11A performs imaging under the unchanged imaging conditions in the first vibration state.

Meanwhile, in a case where the vibration state determination unit 32 determines that the vibration state of the imaging device 11A has reached the first condition in the first vibration state, the vibration state determination unit 32 notifies the exposure control unit 31 of the determination result indicating that the vibration state has transitioned from the first vibration state to the second vibration state. Accordingly, the exposure control unit 31 sets, for the imaging unit 21, the exposure time and the gain based on the imaging condition determination rule in the second vibration state, and the imaging unit 21 performs imaging.

Then, in a case where the vibration state determination unit 32 continues determination that the vibration state of the imaging device 11A has not reached the second condition in the second vibration state, the imaging unit 21 in the imaging device 11A performs imaging under the unchanged imaging conditions based on the imaging condition determination rule in the second vibration state.

Meanwhile, in a case where the vibration state determination unit 32 determines that the vibration state of the imaging device 11A has reached the second condition in the second vibration state, the vibration state determination unit 32 notifies the exposure control unit 31 of the determination result indicating that the vibration state has transitioned from the second vibration state to the first vibration state. Accordingly, the exposure control unit 31 sets the above-described optimum exposure time and optimum gain for the imaging unit 21 as the imaging conditions in the first vibration state, and the imaging unit 21 performs imaging By switching the imaging conditions in the first exposure time control mode to control the exposure time, the OIS control information changes as illustrated in FIG. 18 or 20. That is, when the vibration state becomes the second vibration state and the exposure time becomes equal to or less than the first threshold exposure time, the logic unit 22A outputs the OIS control information (OIS disable) for giving an instruction on stop of the optical image stabilizer in the non-exposure period. Accordingly, the OIS driver 15A performs processing of resetting the relative positional relationship between the position of the lens unit 12 and the position of the imaging unit 21 and returning the positions to the center positions. Next, the logic unit 22A switches the OIS control information to the OIS control information (OIS enable) for giving an instruction on execution of the optical image stabilizer immediately before the start of the exposure time of the next frame. Accordingly, the OIS driver 15A restarts the optical image stabilizer.

By performing the exposure control according to the vibration state as described above, an image in which no exposure blur occurs in the capture result can be obtained, as described with reference to FIG. 20, even in the case where vibration exceeding the correctable range by the optical image stabilizer occurs, as illustrated in FIG. 19.

That is, in the case where the exposure control according to the vibration state is not performed and the vibration exceeding the correctable range by the optical image stabilizer occurs, the optical image stabilizer cannot be performed, and the exposure blur due to the vibration during exposure occurs in the capture result. In contrast, in the case where the exposure control according to the vibration state is performed and the vibration exceeding the correctable range by the optical image stabilizer occurs, the relative positional relationship between the position of the lens unit 12 and the position of the imaging unit 21 is reset in the non-exposure period by setting the exposure time to equal to or less than the first threshold exposure time. Thereby, the image stabilization can be performed over the entire correctable range by the optical image stabilizer at the time of exposure, and an image in which occurrence of the exposure blur is avoided can be obtained in the capture result unless the vibration in one frame exceeds the correctable range by the optical image stabilizer.

Note that, some increase in noise is assumed with the imaging with an increased gain in accordance with the shortened exposure time in the imaging device 11A. However, the influence is smaller than the deterioration of the image quality due to occurrence of the exposure blur, and an image with higher image quality can be obtained.

Moreover, in a case where the vibration state determination unit 32 determines that the vibration state of the imaging device 11A has reached the second condition in the second vibration state, the vibration state determination unit 32 notifies the exposure control unit 31 of the determination result indicating that the vibration state has transitioned from the second vibration state to the first vibration state. Accordingly, the exposure control unit 31 controls exposure of the imaging unit 21 to perform imaging under the imaging conditions in the first vibration state.

That is, when the vibration of the imaging device 11A becomes gentle, the imaging device 11A can correct the vibration in the correctable range by the optical image stabilizer even if the exposure time is made longer than the first threshold exposure time, as illustrated in FIG. 18. Thereby, an image in which no exposure blur occurs and no increase in noise can be obtained in the capture result.

Figure 24:
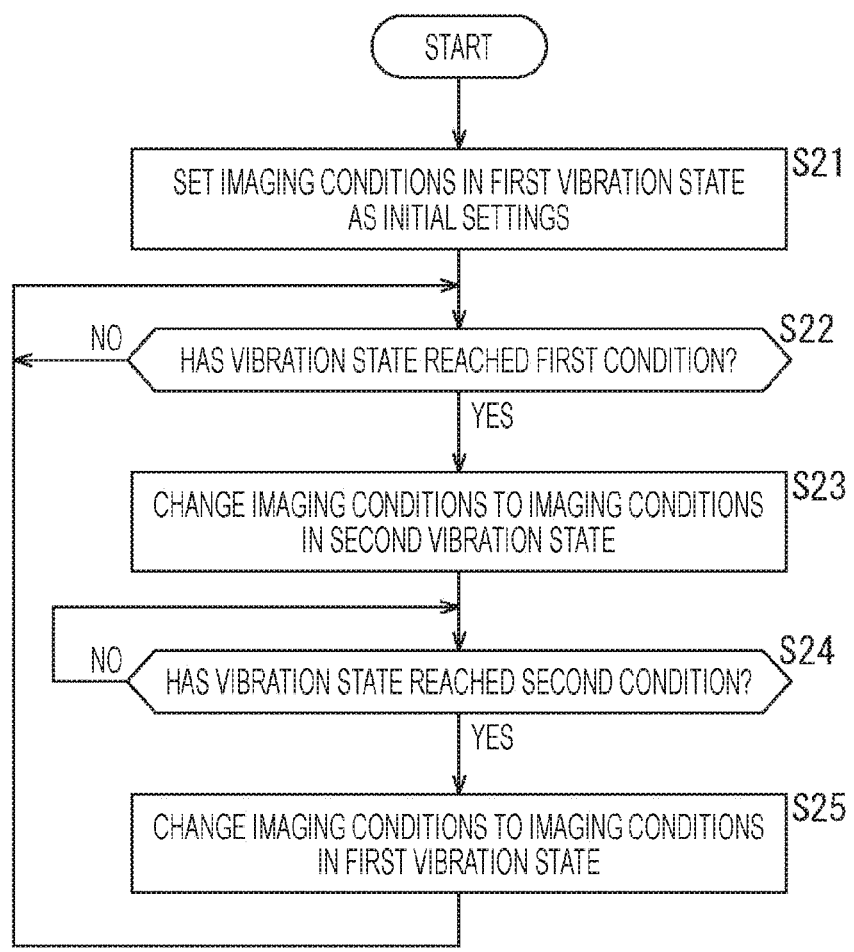
FIG. 24 is a flowchart for describing image stabilization processing in the first exposure time control mode.

The exposure time control in the first exposure time control mode as described with reference to FIG. 23 will be described with reference to the flowchart in FIG. 24.

For example, in the imaging device 11A, the image stabilization processing is started when the imaging unit 21 starts imaging. In step S21, the vibration state determination unit 32 notifies the exposure control unit 31 that the vibration state is the first vibration state, and the exposure control unit 31 sets the imaging conditions in the first vibration state for the imaging unit 21 as initial settings.

In step S22, the vibration state determination unit 32 determines whether or not the vibration state of the imaging device 11A has reached the first condition. In step S22, the processing stands by until the vibration state determination unit 32 determines that the vibration state of the imaging device 11A has reached the first condition, and the imaging unit 21 performs imaging under the unchanged imaging conditions in the first vibration state.

On the other hand, in step S22, in the case where the vibration state determination unit 32 determines that the vibration state of the imaging device 11A has reached the first condition, the processing proceeds to step S23.

In step S23, the vibration state determination unit 32 notifies the exposure control unit 31 of the determination result indicating that the vibration state has transitioned from the first vibration state to the second vibration state. Accordingly, the exposure control unit 31 determines the imaging conditions on the basis of the imaging condition determination rule in the second vibration state and performs exposure control for the imaging unit 21, and the imaging unit 21 performs imaging.

In step S24, the vibration state determination unit 32 determines whether or not the vibration state of the imaging device 11A has reached the second condition. In step S24, the processing stands by until the vibration state determination unit 32 determines that the vibration state of the imaging device 11A has reached the second condition, and the imaging unit 21 performs imaging under the unchanged imaging conditions based on the imaging condition determination rule in the second vibration state.

On the other hand, in step S24, in the case where the vibration state determination unit 32 determines that the vibration state of the imaging device 11A has reached the second condition, the processing proceeds to step S25.

In step S25, the vibration state determination unit 32 notifies the exposure control unit 31 of the determination result indicating that the vibration state has transitioned from the second vibration state to the first vibration state. Accordingly, the exposure control unit 31 performs exposure control for the imaging unit 21 to change the imaging conditions to the imaging conditions in the first vibration state, and the imaging unit 21 performs imaging under the imaging conditions of the first vibration state.

After the processing in step S25, the processing returns to step S22, and hereinafter, similar processing is repeatedly performed until the imaging is terminated.

Here, a method of determining the vibration state by the vibration state determination unit 32 will be described.

For example, the vibration state determination unit 32 can determine whether or not the vibration state is within a set threshold, using lens positional information (for example, Hall data) of the optical image stabilizer.

In the first vibration state, the vibration state determination unit 32 determines that the vibration state transitions to the second vibration state when the value of the Hall data has exceeded a first rate Tp1% (Tp1≤100) with respect to a movable range as the optical image stabilizer by a first determination frame number Tc1 (Tf1≥Tc1≥1) in a first past frame number Tf1 (Tf1≥1). Meanwhile, in the second vibration state, the vibration state determination unit 32 determines that the vibration state transitions to the first vibration state when a peak value of the Hall data has fallen below a second rate Tp2% (Tp2<100) with respect to the movable range as the optical image stabilizer by a second determination frame number Tc2 (Tc2≥1) in succession. For example, the first rate Tp1=75, the first past frame number Tf1=10, the first determination frame number Tc1=3, the second rate Tp2=25, and the second determination frame number Tc2=5 can be set.

Furthermore, the vibration state determination unit 32 can determine whether or not the vibration state is within the set threshold, using an integral angle of the vibration calculated from an angular velocity (gyro signal) and the like output by the motion sensor 14.

In the first vibration state, the vibration state determination unit 32 determines that the vibration state transitions to the second vibration state when the integral angle (angle to be corrected) in one frame has exceeded the first rate Tp1% (Tp1≤100) of the angle movable as the optical image stabilizer by the first determination frame number Tc1 (Tf1≥Tc1≥1) in the first past frame number (Tf1≥1). Meanwhile, in the second vibration state, the vibration state determination unit 32 determines that the vibration state transitions to the first vibration state when the change amount (angle to be corrected) of the integral angle in one frame has fallen below the second rate Tp2% (Tp2<100) of the angle movable as the optical image stabilizer by the second determination frame number Tc2 (Tc2≥1) in succession. For example, the first rate Tp1=75, the first past frame number Tf1=10, the first determination frame number Tc1=3, the second rate Tp2=25, and the second determination frame number Tc2=5 can be set.

Moreover, the vibration state determination unit 32 can determine whether or not the vibration state is within the set threshold, using the angular velocity (gyro signal) output by the motion sensor 14.

In the first vibration state, the vibration state determination unit 32 determines that the vibration state has changed to the second vibration state when a peak value of the angular velocity sampled in one frame has exceeded a preset first angular velocity Thω1 (degree per second) by the first determination frame number Tc1 (Tf1≥Tc1≥1) in the first past frame number Tf1 (Tf1≥1). Meanwhile, in the second vibration state, the vibration state determination unit 32 determines that the vibration state transitions to the first vibration state when the peak value of the angular velocity sampled in one frame has fallen below a preset second angular velocity Thω2 (degree per second) by the second determination frame number Tc2 (Tc2≥1) in succession. For example, the first angular velocity Thω1=20, the first past frame number Tf1=10, the first determination frame number Tc1=3, the second angular velocity Thω2=10, and the second determination frame number Tc2=10 can be set.

In addition, the vibration state determination unit 32 may determine whether or not the vibration state is within the set threshold, using a combination of the above-described Hall data, the integral angle (or a corrected angle), and the angular velocity. Furthermore, an average value may be used instead of the peak value within a frame, and determination may be performed using a predicted value from data of past several frames. Moreover, in determining whether or not the vibration state is within the set threshold, the vibration state determination unit 32 can make determination for each axis (pitch or yaw) or using the magnitude of a vector sum of the axes.

<Second Exposure Time Control Mode>

Change of the imaging conditions in the second exposure time control mode will be described with reference to FIG. 25. Here, in the second exposure time control mode, the vibration state determination unit 32 determines whether the vibration of the imaging device 11A is the first vibration state, the second vibration state, or the third vibration state. Note that, here, as the second exposure time control mode, the three vibration states (three values) of the first vibration state, the second vibration state, and the third vibration state will be described. However, similarly, the vibration state may be classified into four or more vibration states (multi-valued).

In the second exposure time control mode, the vibration state determination unit 32 determines, for each one frame, whether or not the vibration state of the imaging device 11A has reached a predetermined condition, and notifies the exposure control unit 31 of a determination result based on the determination, similarly to the above-described first exposure time control mode.

For example, in the second exposure time control mode in the imaging device 11A, reaching a situation where a state where the vibration of the imaging device 11A exceeds a first threshold in the first vibration state has occurred a predetermined number of times or more during a predetermined period, is set as a first condition for determining the vibration state of the imaging device 11A. Furthermore, reaching a situation where a state where the vibration exceeds a second threshold has occurred a predetermined number of times or more during a predetermined period although the first condition is not satisfied in the first vibration state, is set as a second condition for determining the vibration state of the imaging device 11A (the second threshold<the first threshold). Furthermore, reaching a situation where a state where the vibration of the imaging device 11A exceeds a third threshold has occurred a predetermined number of times or more during a predetermined period in the second vibration state, is set as a third condition for determining the vibration state of the imaging device 11A.

Moreover, in the second exposure time control mode in the imaging device 11A, reaching a situation where a state where the vibration of the imaging device 11A falls below a fourth threshold in the second vibration state has occurred a predetermined number of times or more in succession, is set as a fourth condition for determining the vibration state of the imaging device 11A. Furthermore, reaching a situation where a state where the vibration of the imaging device 11A falls below a fifth threshold in the third vibration state has occurred a predetermined number of times or more in succession, is set as a fifth condition for determining the vibration state of the imaging device 11A. Furthermore, reaching a situation where a state where the vibration of the imaging device 11A falls below a sixth threshold has occurred a predetermined number of times or more in succession although the fifth condition is not satisfied in the third vibration state, is set as a sixth condition for determining the vibration state of the imaging device 11A (the fifth threshold<the sixth threshold).

Furthermore, as the imaging conditions in the first vibration state, the optimum exposure time and the optimum gain are used. Here, the maximum value of the exposure time is adopted as the maximum exposure time allowed within a frame rate, and the optimum exposure time is obtained such that an image with optimum brightness can be captured by the imaging unit 21 on the basis of the image output from the imaging unit 21, the information of an illuminance sensor (not illustrated), and the like. Furthermore, the optimum gain is obtained to optimize the brightness of the image captured with the optimum exposure time.

Moreover, as imaging conditions in a second vibration state, in a case where the optimum exposure time in the first vibration state is longer than a first threshold exposure time, the exposure time is set as the first threshold exposure time, and the value of the gain is set according to the exposure time. Alternatively, in a case where the optimum exposure time in the first vibration state is shorter than the first threshold exposure time, the optimum exposure time and the optimum gain in the first vibration state are set as they are as the imaging conditions (an imaging condition determination rule in the second vibration state). Here, the first threshold exposure time is determined to secure the non-exposure period in which the relative positional relationship between the position of the lens unit 12 and the position of the imaging unit 21 can be reset (can be returned to the center). Furthermore, in the case where the exposure time becomes shorter than the optimum exposure time, the gain is increased from the optimum gain to compensate for the shortage of brightness due to the shortened exposure time, and is obtained to be able to acquire an image with brightness equivalent to an image captured with the optimum exposure time and optimum gain.

Furthermore, as imaging conditions in the third vibration state, in a case where the optimum exposure time in the first vibration state is longer than the second threshold exposure time, the exposure time is set as the second threshold exposure time, and the value of the gain is set according to the exposure time. Alternatively, in a case where the optimum exposure time in the first vibration state is shorter than the second threshold exposure time, the optimum exposure time and the optimum gain in the first vibration state are set as they are as the imaging conditions (an imaging condition determination rule in the third vibration state). Here, the second threshold exposure time is determined to be shorter than the first threshold exposure time. Furthermore, in the case where the exposure time becomes shorter than the optimum exposure time, the gain is increased from the optimum gain to compensate for the shortage of brightness due to the shortened exposure time, and is obtained to be able to acquire an image with brightness equivalent to an image captured with the optimum exposure time and optimum gain.

First, in the imaging device 11A, use of the first vibration state as an initial setting is set in the vibration state determination unit 32 at the start of imaging, and the vibration state determination unit 32 notifies the exposure control unit 31 of the first vibration state as a determination result of the vibration state of the imaging device 11A. Accordingly, the exposure control unit 31 sets the above-described optimum exposure time and optimum gain for the imaging unit 21 as the imaging conditions in the first vibration state, and the imaging unit 21 performs imaging Then, in a case where the vibration state determination unit 32 continues determination that the vibration state of the imaging device 11A has not reached the first and second conditions in the first vibration state, the imaging unit 21 in the imaging device 11A performs imaging under the unchanged imaging conditions in the first vibration state.

Meanwhile, in a case where the vibration state determination unit 32 determines that the vibration state of the imaging device 11A has reached the first condition in the first vibration state, the vibration state determination unit 32 notifies the exposure control unit 31 of the determination result indicating that the vibration state has transitioned from the first vibration state to the third vibration state. Accordingly, the exposure control unit 31 sets, for the imaging unit 21, the exposure time and the gain based on the imaging condition determination rule in the third vibration state, and the imaging unit 21 performs imaging.

Meanwhile, in a case where the vibration state determination unit 32 determines that the vibration state of the imaging device 11A has reached the second condition in the first vibration state, the vibration state determination unit 32 notifies the exposure control unit 31 of the determination result indicating that the vibration state has transitioned from the first vibration state to the second vibration state. Accordingly, the exposure control unit 31 sets, for the imaging unit 21, the exposure time and the gain based on the imaging condition determination rule in the second vibration state, and the imaging unit 21 performs imaging.

Furthermore, in a case where the vibration state determination unit 32 continues determination that the vibration state of the imaging device 11A has not reached the third and fourth conditions in the second vibration state, the imaging unit 21 in the imaging device 11A performs imaging under the unchanged imaging conditions based on the imaging condition determination rule in the second vibration state.

Meanwhile, in a case where the vibration state determination unit 32 determines that the vibration state of the imaging device 11A has reached the third condition in the second vibration state, the vibration state determination unit 32 notifies the exposure control unit 31 of the determination result indicating that the vibration state has transitioned from the second vibration state to the third vibration state. Accordingly, the exposure control unit 31 sets, for the imaging unit 21, the exposure time and the gain based on the imaging condition determination rule in the third vibration state, and the imaging unit 21 performs imaging.

Meanwhile, in a case where the vibration state determination unit 32 determines that the vibration state of the imaging device 11A has reached the fourth condition in the second vibration state, the vibration state determination unit 32 notifies the exposure control unit 31 of the determination result indicating that the vibration state has transitioned from the second vibration state to the first vibration state. Accordingly, the exposure control unit 31 sets the above-described optimum exposure time and optimum gain for the imaging unit 21 as the imaging conditions in the first vibration state, and the imaging unit 21 performs imaging Furthermore, in a case where the vibration state determination unit 32 continues determination that the vibration state of the imaging device 11A has not reached the fifth and sixth conditions in the third vibration state, the imaging unit 21 in the imaging device 11A performs imaging under the unchanged imaging conditions based on the imaging condition determination rule in the third vibration state.

Meanwhile, in a case where the vibration state determination unit 32 determines that the vibration state of the imaging device 11A has reached the fifth condition in the third vibration state, the vibration state determination unit 32 notifies the exposure control unit 31 of the determination result indicating that the vibration state has transitioned from the third vibration state to the first vibration state. Accordingly, the exposure control unit 31 sets the above-described optimum exposure time and optimum gain for the imaging unit 21 as the imaging conditions in the first vibration state, and the imaging unit 21 performs imaging Meanwhile, in a case where the vibration state determination unit 32 determines that the vibration state of the imaging device 11A has reached the sixth condition in the third vibration state, the vibration state determination unit 32 notifies the exposure control unit 31 of the determination result indicating that the vibration state has transitioned from the third vibration state to the second vibration state. Accordingly, the exposure control unit 31 sets, for the imaging unit 21, the exposure time and the gain based on the imaging condition determination rule in the second vibration state, and the imaging unit 21 performs imaging.

By switching the imaging conditions in the second exposure time control mode to control the exposure time, the imaging device 11A can perform exposure control such that no exposure blur occurs according to the vibration state, as described with reference to FIGS. 18 to 22.

Note that, in the case where vibration exceeding the correctable range by the optical image stabilizer occurs even under the vibration conditions in the third vibration state, occurrence of the exposure blur cannot be avoided, and occurrence of a blur in the image is assumed. In this case, to cope with occurrence of a blur in the image, a shorter exposure time may be set as the second threshold exposure time to make a vibration amount during the exposure period small. Moreover, the exposure control may be performed by finely dividing the vibration state into four or five stages rather than setting the imaging conditions in three stages as illustrated in FIG. 25.

Exposure time control in the second exposure time control mode as described with reference to FIG. 25 will be described with reference to the flowchart in FIG. 26.

For example, in the imaging device 11A, the image stabilization processing is started when the imaging unit 21 starts imaging. In step S31, the vibration state determination unit 32 notifies the exposure control unit 31 that the vibration state is the first vibration state, and the exposure control unit 31 sets the imaging conditions in the first vibration state for the imaging unit 21 as initial settings.

In step S32, the vibration state determination unit 32 determines whether or not the vibration state of the imaging device 11A has reached the first condition. In a case where the vibration state determination unit 32 determines in step S32 that the vibration state of the imaging device 11A has not reached the first condition, the processing proceeds to step S33.

In step S33, the vibration state determination unit 32 determines whether or not the vibration state of the imaging device 11A has reached the second condition. In a case where the vibration state determination unit 32 determines in step S33 that the vibration state of the imaging device 11A has not reached the second condition, the processing returns to step S32, and similar processing is repeated. That is, the processing stands by until determination is made in step S32 that the vibration state has reached the first condition or in step S33 that the vibration state has reached the second condition, and the imaging unit 21 performs imaging under the unchanged imaging conditions in the first vibration state.

On the other hand, in step S33, in the case where the vibration state determination unit 32 determines that the vibration state of the imaging device 11A has reached the second condition, the processing proceeds to step S34.

In step S34, the vibration state determination unit 32 notifies the exposure control unit 31 of the determination result indicating that the vibration state has transitioned from the first vibration state to the second vibration state. Accordingly, the exposure control unit 31 performs exposure control for the imaging unit 21 on the basis of the imaging condition determination rule in the second vibration state, and the imaging unit 21 performs imaging.

In step S35, the vibration state determination unit 32 determines whether or not the vibration state of the imaging device 11A has reached the third condition. In a case where the vibration state determination unit 32 determines in step S35 that the vibration state of the imaging device 11A has not reached the third condition, the processing proceeds to step S36.

In step S36, the vibration state determination unit 32 determines whether or not the vibration state of the imaging device 11A has reached the fourth condition. In a case where the vibration state determination unit 32 determines in step S36 that the vibration state of the imaging device 11A has not reached the fourth condition, the processing returns to step S35, and hereinafter, similar processing is repeated. That is, the processing stands by until determination is made in step S35 that the vibration state has reached the third condition or in step S36 that the vibration state has reached the fourth condition, and the imaging unit 21 performs imaging under the unchanged imaging conditions based on the imaging condition determination rule in the second vibration state.

On the other hand, in step S36, in the case where the vibration state determination unit 32 determines that the vibration state of the imaging device 11A has reached the fourth condition, the processing proceeds to step S37.

In step S37, the vibration state determination unit 32 notifies the exposure control unit 31 of the determination result indicating that the vibration state has transitioned from the second vibration state to the first vibration state. Accordingly, the exposure control unit 31 sets the above-described optimum exposure time and optimum gain for the imaging unit 21, and the imaging unit 21 performs imaging After the processing in step S37, the processing returns to step S32, and hereinafter, similar processing is repeatedly performed until the imaging is terminated.

Meanwhile, in a case where the vibration state determination unit 32 determines in step S32 that the vibration state of the imaging device 11A has reached the first condition, or in a case where the vibration state determination unit 32 determines in step S35 that the vibration state of the imaging device 11A has reached the third condition, the processing proceeds to step S38.

In step S38, the vibration state determination unit 32 notifies the exposure control unit 31 of the determination result indicating that the vibration state has transitioned from the first or second vibration state to the third vibration state. Accordingly, the exposure control unit 31 performs exposure control for the imaging unit 21 to perform imaging under the imaging conditions based on the imaging condition determination rule in the third vibration state, and the imaging unit 21 performs imaging.

In step S39, the vibration state determination unit 32 determines whether or not the vibration state of the imaging device 11A has reached the fifth condition. In a case where the vibration state determination unit 32 determines in step S39 that the vibration state of the imaging device 11A has not reached the fifth condition, the processing proceeds to step S40.

In step S40, the vibration state determination unit 32 determines whether or not the vibration state of the imaging device 11A has reached the sixth condition. In a case where the vibration state determination unit 32 determines in step S40 that the vibration state of the imaging device 11A has not reached the sixth condition, the processing returns to step S39, and hereinafter, similar processing is repeated. That is, the processing stands by until determination is made in step S39 that the vibration state has reached the fifth condition or in step S40 that the vibration state has reached the sixth condition, and the imaging unit 21 performs imaging under the unchanged imaging conditions based on the imaging condition determination rule in the third vibration state.

Meanwhile, the processing proceeds to step S34 in a case where the vibration state determination unit 32 determines in step S40 that the vibration state of the imaging device 11A has reached the sixth condition, and hereinafter, the imaging unit 21 performs imaging under the imaging conditions based on the imaging condition determination rule in the second vibration state, as described above.

Meanwhile, the processing proceeds to step S37 in a case where the vibration state determination unit 32 determines in step S39 that the vibration state of the imaging device 11A has reached the fifth condition, and hereinafter, the imaging unit 21 performs imaging under the imaging conditions in the first vibration state, as described above.

Thereafter, similar processing is repeatedly performed until the imaging is terminated.

A modification of transition of the vibration state in the second exposure time control mode will be described with reference to FIG. 27.

In the above transition of the vibration state described with reference to FIG. 25, it is possible to make determination to jump over the second vibration state that is between the first vibration state and the third vibration state, such as transition from the first vibration state to the third vibration state or transition from third vibration state to first vibration state. In contrast, as illustrated in FIG. 27, it is also possible to transition from each vibration state to only another adjacent vibration state in order of magnitude of vibration.

That is, it is possible to reduce a discomfort with the change in the exposure time by changing the exposure time in stages, rather than abruptly changing the exposure time according to the vibration state. Furthermore, it is possible to reduce the condition that serves as a criterion in each vibration state.

Figure 27:
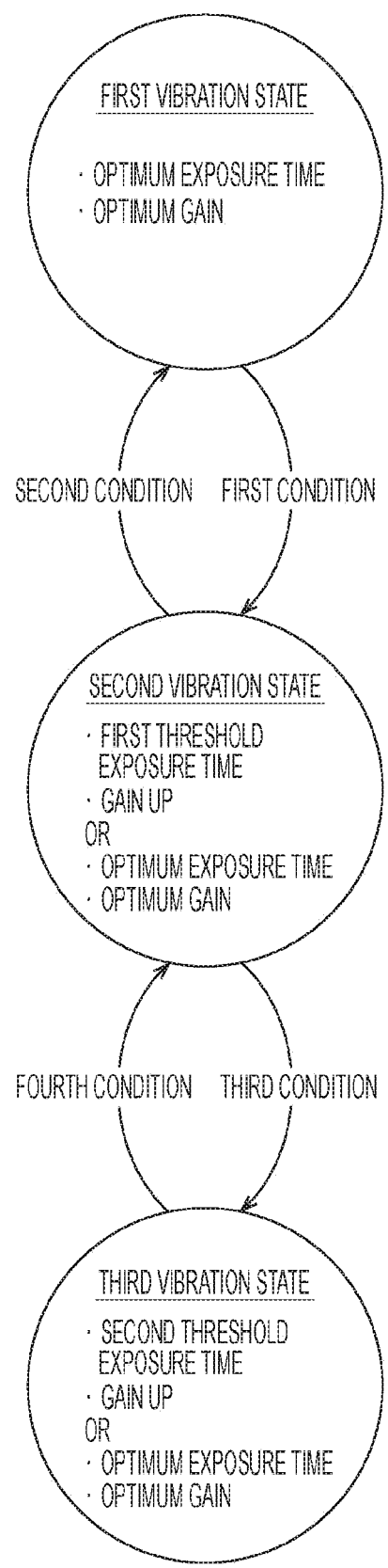
FIG. 27 is a diagram for describing a modification of transition of the vibration state in the second exposure time control mode.

Furthermore, FIG. 27 illustrates an example of changing the vibration state in two stages, and it is possible to change each vibration state to only one-step preceding or subsequent vibration state. In contrast, for example, in a case of changing the vibration state in two or more stages, it is possible to change each vibration state to two-step preceding or subsequent vibration state or to change each vibration state to three-step preceding or subsequent vibration state. Furthermore, it is also possible to change each vibration state in different steps.

Furthermore, as the method of determining the vibration state by the vibration state determination unit 32, the above-described Hall data, integral angle (or angle to be corrected), angular velocity, or a combination thereof can be used, similarly to the method described in the first exposure time control mode. Furthermore, an average value may be used instead of the peak value within a frame, and determination may be performed using a predicted value from data of past several frames. Moreover, in determining whether or not the vibration state is within the set threshold, the vibration state determination unit 32 can make determination for each axis (pitch or yaw) or using the magnitude of a vector sum of the axes.

Figure 25:
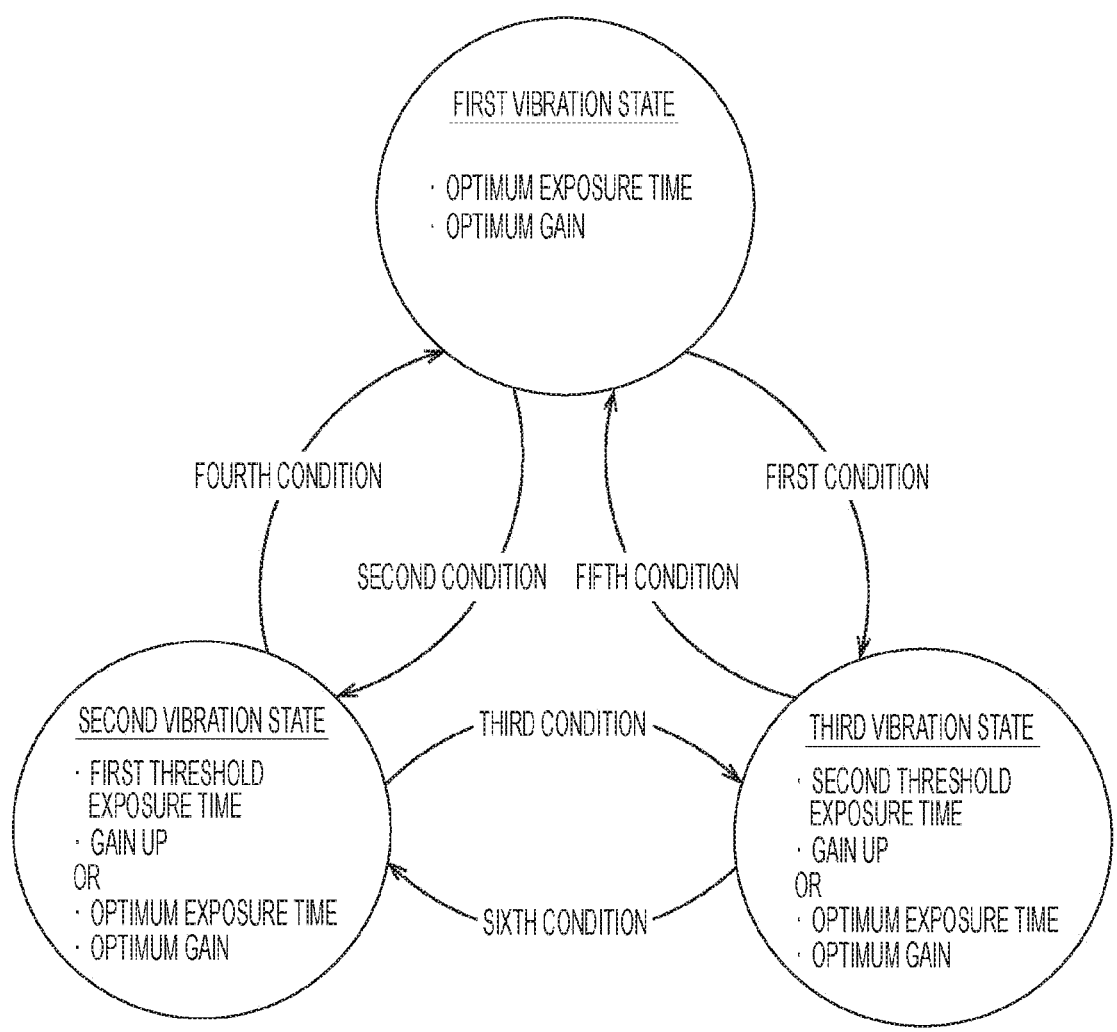
FIG. 25 is a diagram for describing an example of transition of a vibration state in a second exposure time control mode.
Figure 26:
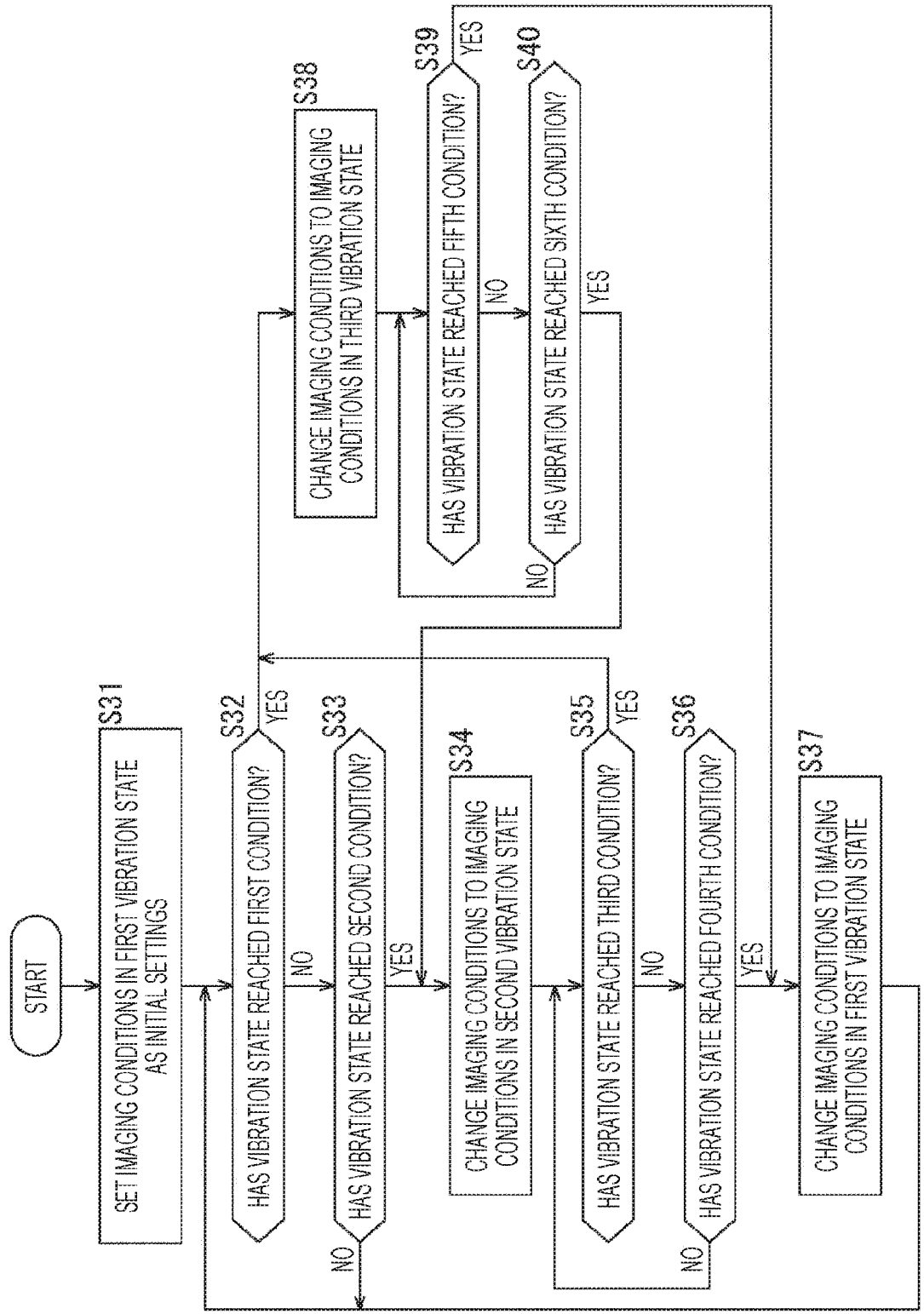
FIG. 26 is a flowchart for describing image stabilization processing in the second exposure time control mode.

Even in the transition of the vibration state illustrated in FIGS. 25 and 27, an image in which no exposure blur occurs in a capture result can be obtained on a steady basis by controlling the exposure time according to the determination result of the vibration state.

Note that, in the imaging device 11A illustrated in FIG. 17, the configuration example in which the logic unit 22A includes the exposure control unit 31 and the vibration state determination unit 32 has been described. However, the exposure control unit 31 and the vibration state determination unit 32 may be separately configured from the logic unit 22A. For example, the exposure control unit 31 and the vibration state determination unit 32 can be provided in an imaging device control unit outside the image sensor 13A. Furthermore, the vibration state determination unit 32 may be included in the exposure control unit 31.

Note that each processing described with reference to the above-described flowchart does not necessarily need to be chronologically processed according to the order described as the flowchart, and includes processing executed in parallel or individually (for example, parallel processing or object processing). Furthermore, the program may be processed by one single CPU or may be processed in a distributed manner by a plurality of CPUs.

Furthermore, in the above-described embodiment, the configuration of the imaging device 11 has been described. However, the present invention can be applied to a camera module provided with at least the image sensor 13, the motion sensor 14, the OIS driver 15, the OIS actuator 16, and the signal processing circuit 17, or various electronic devices in which the aforementioned camera module is mounted.

Moreover, the imaging device 11 may not include the logic unit 22 that applies the electronic image stabilization for the image output from the image sensor 13. That is, the function of the logic unit 22 may be provided in a unit different from the imaging device 11, and image data to which the positional information of the lens unit 12 and the angular velocity data synchronized with a position on the image are added may just be output to the unit. Of course, by adopting the configuration in which the imaging device 11 includes the logic unit 22, more favorably, the configuration in which the signal processing circuit 17 is included in the semiconductor chip of the stacked image sensor 13, the image stabilization processing can be executed with high accuracy, and the system can be easily constructed.

Figure 28:
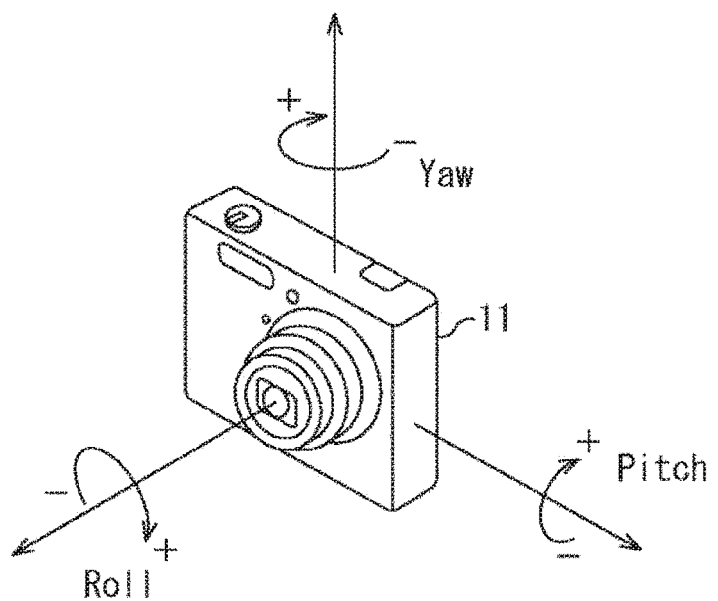
FIG. 28 is a diagram illustrating definitions of a pitch direction, a yaw direction, and a roll direction.

Note that, in the above-described embodiment, the camera shake occurring in the imaging device 11 (that is, the vibration of the image sensor 13 built in the imaging device 11) is defined by rotation in the pitch direction, yaw direction, and roll direction, as illustrated in FIG. 28.

<Use Examples of Image Sensor>

Figure 29:
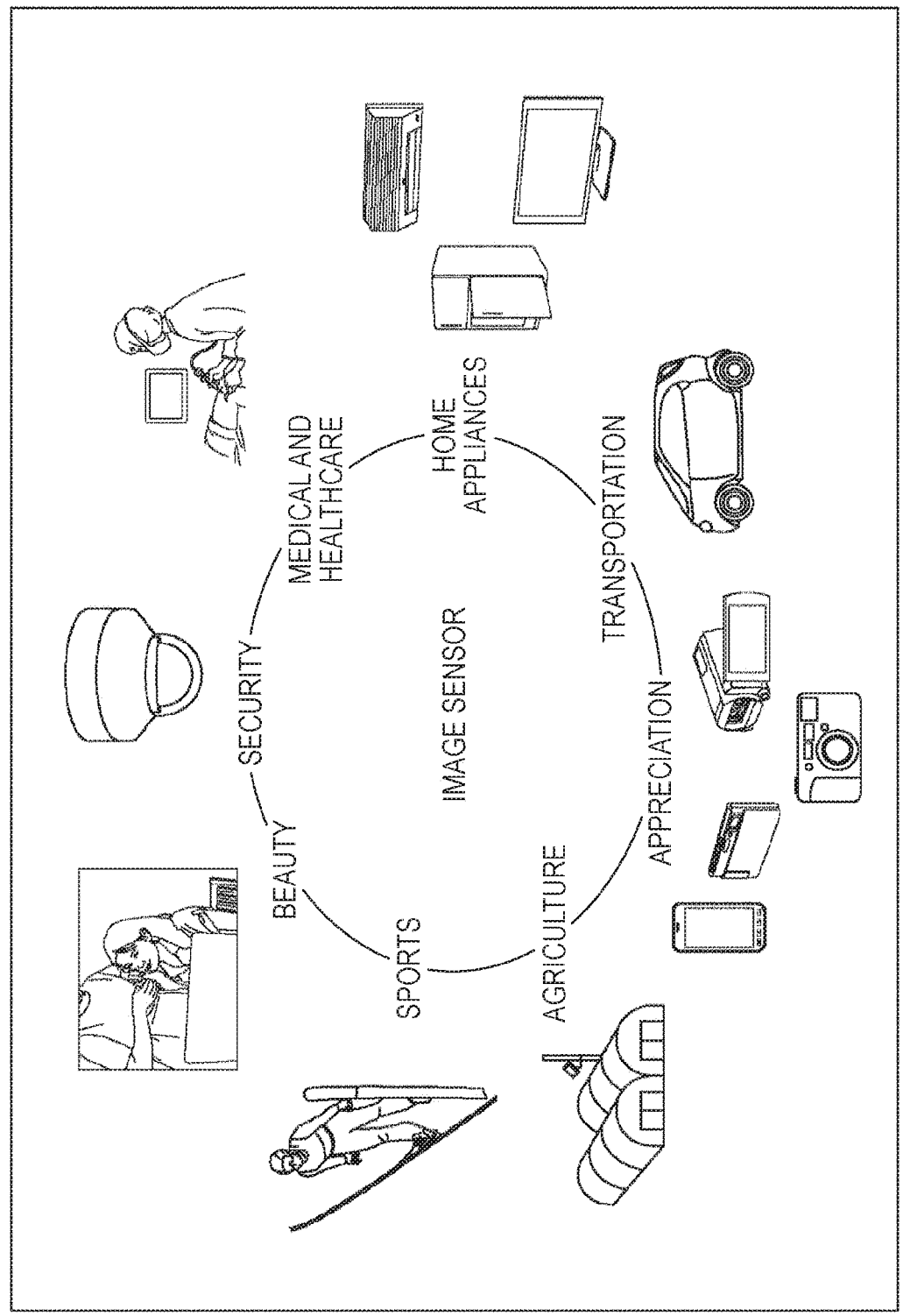
FIG. 29 is a diagram illustrating use examples of an image sensor.

FIG. 29 is a diagram illustrating use examples of the above-described image sensor.

The above-described image sensor can be used in various cases of sensing light such as visible light, infrared light, ultraviolet light, and an X-rays, for example as follows.

- Devices that capture an image provided for appreciation use, such as a digital camera or a mobile device with a camera function.
- Devices provided for transportation, such as in-vehicle sensors that capture the front, rear, peripheries, an interior of the vehicle, etc. for safe driving such as automatic stop, recognition of a state of a driver, or the like, monitoring cameras that monitor traveling vehicles and roads, distance measuring sensors that measure a distance between vehicles, and the like
- Devices provided for home appliances such as TVs, refrigerators, and air conditioners to capture gestures of users and perform device operations according to the gestures Devices provided for medical and healthcare, such as endoscopes, devices that perform angiography by receiving infrared light Devices provided for security, such as monitoring cameras for crime prevention and cameras for person authentication use Devices for beauty, such as skin measuring instruments that capture skin and microscopes that capture scalp Devices provided for sports or the like, such as action cameras and wearable cameras for sport use Devices provided for agriculture, such as cameras for monitoring the condition of fields and crops Note that the present technology can also have the following configurations.

(1)

An imaging device including:

a state determination unit configured to determine a state of a motion of an imaging unit that performs imaging to acquire an image via an optical system that collects light; and an exposure control unit configured to perform at least control for an exposure time of the imaging unit according to a determination result by the state determination unit, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

(2)

The imaging device according to (1), in which, in a case where the exposure control unit has performed control for making the exposure time of the imaging unit shorter than an optimum exposure time in which the image is able to be captured with optimum brightness, the exposure control unit obtains a gain that compensates for a shortage from the optimum brightness and amplifies brightness of the image.

(3)

The imaging device according to (2), in which, in a case where the state determination unit determines that the motion of the imaging unit has a magnitude within a correctable range by the optical correction, the exposure control unit obtains the optimum exposure time, using a maximum value of the exposure time of the imaging unit as a maximum exposure time allowed within a frame rate, and sets the obtained optimum exposure time for the imaging unit.

(4)

The imaging device according to (3), in which, in a case where the state determination unit determines that there is a possibility that the motion of the imaging unit exceeds the correctable range by the optical correction, the exposure control unit obtains the exposure time, using a first threshold exposure time in which the non-exposure period where the relative positional relationship between the optical system and the imaging unit is resettable is securable as the maximum exposure time, and sets the obtained exposure time for the imaging unit.

(5)

The imaging device according to (4), in which, in a case where the state determination unit determines that there is a possibility that the motion of the imaging unit exceeds the correctable range due to optical correction for the image within the exposure period of one frame even in a case of exposure in the first threshold exposure time, the exposure control unit obtains the exposure time, using a second threshold exposure time shorter than the first threshold exposure time as the maximum exposure time, and sets the obtained exposure time for the imaging unit.

(6)

The imaging device according to any one of (1) to (5), in which the state determination unit determines the state of the motion of the imaging unit, using positional information of the optical system driven for performing the optical correction.

(7)

The imaging device according to any one of (1) to (6), in which the state determination unit determines the state of the motion of the imaging unit, using an angular velocity detected by a detection unit that physically detects the motion of the imaging unit or an integral angle of vibration calculated from the angular velocity.

(8)

The imaging device according to any one of (1) to (7), further including:

a drive control unit configured to obtain a moving amount of when relatively moving at least one of the optical system or the imaging unit and optically correcting a blur appearing in an image captured by the imaging unit on the basis of the physically detected motion of the imaging unit, and control driving of at least one of the optical system or the imaging unit;

a signal processing unit configured to apply signal processing for correcting an influence of the motion of the imaging unit on the image according to a function for converting a position on the basis of positional information and motion information synchronized for each coordinate on the image on the basis of the positional information that is a detected position of the optical system or the imaging unit driven under control by the drive control unit and the motion information indicating the physically detected motion of the imaging unit;

a logic unit configured to supply, to the signal processing unit, the positional information and the motion information, and timing information indicating timing to synchronize the positional information and the motion information with the coordinate on the image, together with the image captured by the imaging unit; and a drive unit configured to drive at least one of the optical system or the imaging unit according to the moving amount obtained by the drive control unit, detect the position of the optical system or the imaging unit according to the driving, and supply the positional information to the drive control unit.

(9)

The imaging device according to (8), in which the logic unit generates control information instructing execution or stop of the optical correction and supplies the generated control information to the drive control unit according to exposure timing to perform exposure by the imaging unit, and the drive control unit controls, on the basis of the control information, relative driving for the optical system or the imaging unit to optically correct a blur appearing in the image according to the exposure period of one frame by the exposure time, and driving for resetting the relative positional relationship between the optical system and the imaging unit, the relative positional relationship being caused during the exposure period, according to the non-exposure period.

(10)

A solid-state imaging element configured by stacking:

a semiconductor chip on which an imaging unit that performs imaging to acquire an image via an optical system that collects light is formed; and a semiconductor chip on which a logic unit including a state determination unit that determines a state of a motion of the imaging unit and an exposure control unit that performs at least control for an exposure time of the imaging unit according to a determination result by the state determination unit is formed, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

(11)

A camera module including:

an optical system configured to collect light;

an imaging unit configured to perform imaging via the optical system to acquire an image;

a state determination unit configured to determine a state of a motion of the imaging unit; and an exposure control unit configured to perform at least control for an exposure time of the imaging unit according to a determination result by the state determination unit, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

(12)

A drive control unit in which at least control for an exposure time of an imaging unit that performs imaging to acquire an image via an optical system that collects light is performed according to a determination result of a state of a motion of the imaging unit, the drive control unit configured to control relative driving for the optical system or the imaging unit to optically correct a blur appearing in the image according to an exposure period of one frame by the exposure time; and control driving for resetting a relative positional relationship between the optical system and the imaging unit, the relative positional relationship being caused during the exposure period, according to a non-exposure period in which exposure is not performed between the frames.

(13)

An imaging method including:

by an imaging device including an imaging unit that performs imaging to acquire an image via an optical system that collects light, determining a state of a motion of the imaging unit; and performing at least control for an exposure time of the imaging unit according to a determination result by the state determination unit, in which relative driving for the optical system or the imaging unit is performed to optically correct a blur appearing in the image according to an exposure period of one frame by the exposure time, and driving for resetting a relative positional relationship between the optical system and the imaging unit, the relative positional relationship being caused during the exposure period, is performed according to a non-exposure period in which exposure is not performed between the frames.

Note that the present embodiments are not limited to the above-described embodiments, and various modifications can be made without departing from the gist of the present disclosure. Furthermore, the effects described in the present specification are merely examples and are not limited, and other effects may be exhibited.

REFERENCE SIGNS LIST

11 Imaging device
12 Lens unit
13 Image sensor
14 Motion sensor
15 OIS driver
16 OIS actuator
17 Signal processing circuit
18 Display
19 Recoding medium
21 Imaging unit
22 Logic unit
31 Exposure control unit
32 Vibration state determination unit

The invention claimed is:

1. An imaging device, comprising:
at least one central processing unit (CPU) configured to:
determine a state of a motion of an imaging circuitry that performs imaging to acquire an image via a plurality of lens that collects light;
perform at least control for an exposure time of the imaging circuitry according to the determined state, wherein
relative driving for the plurality of lens or the imaging circuitry is performed to optically correct a blur appearing in the image according to an exposure period of one frame by the exposure time, and
driving for resetting a relative positional relationship between the plurality of lens and the imaging circuitry, the relative positional relationship being caused during the exposure period, is performed according to a non-exposure period in which exposure is not performed between the frames;
obtain, based on the motion of the imaging circuitry has a magnitude within a correctable range by the optical correction, an optimum exposure time in which the image is able to be captured with optimum brightness, wherein the optimum exposure time is obtained based on a maximum value of the exposure time of the imaging circuitry as a maximum exposure time allowed within a frame rate; and
set the obtained optimum exposure time for the imaging circuitry.

2. The imaging device according to claim 1, wherein, the at least one CPU is further configured to obtain, based on the exposure time of the imaging circuitry is shorter than the optimum exposure time, a gain that compensates for a shortage from the optimum brightness and amplifies brightness of the image.

3. The imaging device according to claim 1, wherein the at least one CPU is further configured to:
obtain, based on a possibility that the motion of the imaging circuitry exceeds the correctable range by the optical correction, the exposure time, using a first threshold exposure time in which the non-exposure period where the relative positional relationship between the plurality of lens and the imaging circuitry is resettable is securable as the maximum exposure time; and
set the obtained exposure time for the imaging circuitry.

4. The imaging device according to claim 3, wherein the at least one CPU is further configured to:
obtain, based on a possibility that the motion of the imaging circuitry exceeds the correctable range due to the optical correction for the image within the exposure period of one frame even in a case of exposure in the first threshold exposure time, the exposure time, using a second threshold exposure time shorter than the first threshold exposure time as the maximum exposure time; and
set the obtained exposure time for the imaging circuitry.

5. The imaging device according to claim 1, wherein the at least one CPU is further configured to determine the state of the motion of the imaging circuitry, using positional information of the plurality of lens driven for performing the optical correction.

6. The imaging device according to claim 1, wherein the at least one CPU is further configured to determine the state of the motion of the imaging circuitry, using an angular velocity of the imaging circuitry or an integral angle of vibration calculated from the angular velocity.

7. The imaging device according to claim 1, wherein the at least one CPU is further configured to:
obtain a moving amount of when relatively moving at least one of the plurality of lens or the imaging circuitry;
optically correct a blur appearing in the image captured by the imaging circuitry based on the motion of the imaging circuitry;
apply signal processing for correcting an influence of the motion of the imaging circuitry on the image according to a function for converting a position based on positional information and motion information synchronized for each coordinate on the image based on the positional information that is a detected position of the plurality of lens or the imaging circuitry and the motion information;
control drive of at least one of the plurality of lens or the imaging circuitry according to the moving amount; and
detect the position of the plurality of lens or the imaging circuitry according to the driving.

8. The imaging device according to claim 7, wherein the at least one CPU is configured to:
generate control information instructing execution or stop of the optical correction;
control, based on the control information, relative driving for the plurality of lens or the imaging circuitry to optically correct a blur appearing in the image according to the exposure period of one frame by the exposure time; and
control driving for resetting the relative positional relationship between the plurality of lens and the imaging circuitry, the relative positional relationship being caused during the exposure period, according to the non-exposure period.

9. A solid-state imaging element configured by stacking:
a semiconductor chip on which an imaging circuitry, that performs imaging to acquire an image via a plurality of lens that collects light, is formed; and
a semiconductor chip on which at least one central processing unit (CPU) is formed, wherein the at least one CPU is configured to:
determine a state of a motion of the imaging circuitry;
perform at least control for an exposure time of the imaging circuitry according to the determined state, wherein
relative driving for the plurality of lens or the imaging circuitry is performed to optically correct a blur appearing in the image according to an exposure period of one frame by the exposure time, and
driving for resetting a relative positional relationship between the plurality of lens and the imaging circuitry, the relative positional relationship being caused during the exposure period, is performed according to a non-exposure period in which exposure is not performed between the frames;
obtain, based on the motion of the imaging circuitry has a magnitude within a correctable range by the optical correction, an optimum exposure time in which the image is able to be captured with optimum brightness, wherein the optimum exposure time is obtained based on a maximum value of the exposure time of the imaging circuitry as a maximum exposure time allowed within a frame rate; and
set the obtained optimum exposure time for the imaging circuitry.

10. A camera module, comprising:
a plurality of lens configured to collect light;
an imaging circuitry configured to perform imaging via the plurality of lens to acquire an image; and
at least one central processing unit (CPU) configured to:
determine a state of a motion of the imaging circuitry;
perform at least control for an exposure time of the imaging circuitry according to the determined state, wherein
relative driving for the plurality of lens or the imaging circuitry is performed to optically correct a blur appearing in the image according to an exposure period of one frame by the exposure time, and
driving for resetting a relative positional relationship between the plurality of lens and the imaging circuitry, the relative positional relationship being caused during the exposure period, is performed according to a non-exposure period in which exposure is not performed between the frames;
obtain, based on the motion of the imaging circuitry has a magnitude within a correctable range by the optical correction, an optimum exposure time in which the image is able to be captured with optimum brightness, wherein the optimum exposure time is obtained based on a maximum value of the exposure time of the imaging circuitry as a maximum exposure time allowed within a frame rate; and
set the obtained optimum exposure time for the imaging circuitry.

11. A drive control apparatus in which
at least one central processing unit (CPU) configured to:
control an exposure time of an imaging circuitry that performs imaging to acquire an image via a plurality of lens that collects light is performed according to a state of a motion of the imaging circuitry;

control relative driving for the plurality of lens or the imaging circuitry to optically correct a blur appearing in the image according to an exposure period of one frame by the exposure time;

control driving for resetting a relative positional relationship between the plurality of lens and the imaging circuitry, the relative positional relationship being caused during the exposure period, according to a non-exposure period in which exposure is not performed between the frames;

obtain, based on the motion of the imaging circuitry has a magnitude within a correctable range by the optical correction, an optimum exposure time in which the image is able to be captured with optimum brightness, wherein the optimum exposure time is obtained based on a maximum value of the exposure time of the imaging circuitry as a maximum exposure time allowed within a frame rate; and set the obtained optimum exposure time for the imaging circuitry.

12. An imaging method, comprising:

by an imaging device including an imaging circuitry that performs imaging to acquire an image via a plurality of lens that collects light, determining a state of a motion of the imaging circuitry;

performing at least control for an exposure time of the imaging circuitry according to the determined state, wherein relative driving for the plurality of lens or the imaging circuitry is performed to optically correct a blur appearing in the image according to an exposure period of one frame by the exposure time, and driving for resetting a relative positional relationship between the plurality of lens and the imaging circuitry, the relative positional relationship being caused during the exposure period, is performed according to a non-exposure period in which exposure is not performed between the frames;

obtaining, based on the motion of the imaging circuitry has a magnitude within a correctable range by the optical correction, an optimum exposure time in which the image is able to be captured with optimum brightness, wherein the optimum exposure time is obtained based on a maximum value of the exposure time of the imaging circuitry as a maximum exposure time allowed within a frame rate; and setting the obtained optimum exposure time for the imaging circuitry.

* * * * *